(12) United States Patent
Kavuri

(10) Patent No.: US 8,725,980 B2
(45) Date of Patent: May 13, 2014

(54) SYSTEM AND METHOD FOR ALLOCATION OF ORGANIZATIONAL RESOURCES

(75) Inventor: Srinivas Kavuri, South Plainfield, NJ (US)

(73) Assignee: CommVault Systems, Inc., Oceanport, NJ (US)

( * ) Notice: Subject to any disclaimer, the term of this patent is extended or adjusted under 35 U.S.C. 154(b) by 0 days.

(21) Appl. No.: 13/606,371

(22) Filed: Sep. 7, 2012

(65) Prior Publication Data

US 2013/0124734 A1 May 16, 2013

Related U.S. Application Data

(63) Continuation of application No. 11/639,830, filed on Dec. 15, 2006, now Pat. No. 8,266,406, and a continuation-in-part of application No. 11/120,619, filed on May 2, 2005, now Pat. No. 7,343,453.

(60) Provisional application No. 60/752,196, filed on Dec. 19, 2005, provisional application No. 60/752,197, filed on Dec. 19, 2005, provisional application No. 60/567,178, filed on Apr. 30, 2004.

(51) Int. Cl.
G06F 12/00 (2006.01)
G06F 13/00 (2006.01)
G06F 13/28 (2006.01)

(52) U.S. Cl.
USPC .......................................................... 711/170

(58) Field of Classification Search
USPC .......................................................... 711/170
See application file for complete search history.

(56) References Cited

U.S. PATENT DOCUMENTS

| | | | |
|---|---|---|---|
| 4,686,620 | A | 8/1987 | Ng |
| 4,995,035 | A | 2/1991 | Cole et al. |
| 5,005,122 | A | 4/1991 | Griffin et al. |
| 5,093,912 | A | 3/1992 | Dong et al. |
| 5,133,065 | A | 7/1992 | Cheffetz et al. |
| 5,193,154 | A | 3/1993 | Kitajima et al. |
| 5,212,772 | A | 5/1993 | Masters |
| 5,226,157 | A | 7/1993 | Nakano et al. |

(Continued)

FOREIGN PATENT DOCUMENTS

| | | |
|---|---|---|
| EP | 0259912 | 3/1988 |
| EP | 0405926 | 1/1991 |

(Continued)

OTHER PUBLICATIONS

Armstead et al., "Implementation of a Campus-Wide Distributed Mass Storage Service: The Dream vs. Reality," IEEE, 1995, pp. 190-199.

(Continued)

*Primary Examiner* — Sheng-Jen Tsai
(74) *Attorney, Agent, or Firm* — Knobbe, Martens, Olson & Bear, LLP

(57) ABSTRACT

System and methods for storing electronic data is provided, where the system comprises a storage manager component and a management module associated with the storage manager component. The management module is configured to receive information related to storage activities associated with one or more storage operation components within the storage operation system under the direction of the storage manager component. The management module is adapted to predict storage operation resource allocations based on the received information related to the storage activities.

15 Claims, 17 Drawing Sheets

(56) References Cited

U.S. PATENT DOCUMENTS

| | | |
|---|---|---|
| 5,239,647 A | 8/1993 | Anglin et al. |
| 5,241,668 A | 8/1993 | Eastridge et al. |
| 5,241,670 A | 8/1993 | Eastridge et al. |
| 5,276,860 A | 1/1994 | Fortier et al. |
| 5,276,867 A | 1/1994 | Kenley et al. |
| 5,287,500 A | 2/1994 | Stoppani, Jr. |
| 5,313,631 A | 5/1994 | Kao |
| 5,321,816 A | 6/1994 | Rogan et al. |
| 5,333,315 A | 7/1994 | Saether et al. |
| 5,347,653 A | 9/1994 | Flynn et al. |
| 5,410,700 A | 4/1995 | Fecteau et al. |
| 5,448,724 A | 9/1995 | Hayashi et al. |
| 5,491,810 A | 2/1996 | Allen |
| 5,495,607 A | 2/1996 | Pisello et al. |
| 5,504,873 A | 4/1996 | Martin et al. |
| 5,544,345 A | 8/1996 | Carpenter et al. |
| 5,544,347 A | 8/1996 | Yanai et al. |
| 5,559,957 A | 9/1996 | Balk |
| 5,619,644 A | 4/1997 | Crockett et al. |
| 5,638,509 A | 6/1997 | Dunphy et al. |
| 5,673,381 A | 9/1997 | Huai et al. |
| 5,699,361 A | 12/1997 | Ding et al. |
| 5,729,743 A | 3/1998 | Squibb |
| 5,751,997 A | 5/1998 | Kullick et al. |
| 5,758,359 A | 5/1998 | Saxon |
| 5,761,677 A | 6/1998 | Senator et al. |
| 5,764,972 A | 6/1998 | Crouse et al. |
| 5,778,395 A | 7/1998 | Whiting et al. |
| 5,812,398 A | 9/1998 | Nielsen |
| 5,813,009 A | 9/1998 | Johnson et al. |
| 5,813,017 A | 9/1998 | Morris |
| 5,875,478 A | 2/1999 | Blumenau |
| 5,887,134 A | 3/1999 | Ebrahim |
| 5,901,327 A | 5/1999 | Ofek |
| 5,924,102 A | 7/1999 | Perks |
| 5,950,205 A | 9/1999 | Aviani, Jr. |
| 5,974,563 A | 10/1999 | Beeler, Jr. |
| 6,021,415 A | 2/2000 | Cannon et al. |
| 6,026,414 A | 2/2000 | Anglin |
| 6,052,735 A | 4/2000 | Ulrich et al. |
| 6,058,066 A | 5/2000 | Norris et al. |
| 6,076,148 A | 6/2000 | Kedem et al. |
| 6,088,697 A | 7/2000 | Crockett et al. |
| 6,094,416 A | 7/2000 | Ying |
| 6,131,095 A | 10/2000 | Low et al. |
| 6,131,147 A | 10/2000 | Takagi |
| 6,131,190 A | 10/2000 | Sidwell |
| 6,148,412 A | 11/2000 | Cannon et al. |
| 6,154,787 A | 11/2000 | Urevig et al. |
| 6,157,963 A | 12/2000 | Courtright, III et al. |
| 6,161,111 A | 12/2000 | Mutalik et al. |
| 6,167,402 A | 12/2000 | Yeager |
| 6,212,512 B1 | 4/2001 | Barney et al. |
| 6,260,068 B1 | 7/2001 | Zalewski et al. |
| 6,260,069 B1 | 7/2001 | Anglin |
| 6,269,431 B1 | 7/2001 | Dunham |
| 6,275,953 B1 | 8/2001 | Vahalia et al. |
| 6,301,592 B1 | 10/2001 | Aoyama et al. |
| 6,324,581 B1 | 11/2001 | Xu et al. |
| 6,328,766 B1 | 12/2001 | Long |
| 6,330,570 B1 | 12/2001 | Crighton |
| 6,330,642 B1 | 12/2001 | Carteau |
| 6,343,324 B1 | 1/2002 | Hubis et al. |
| RE37,601 E | 3/2002 | Eastridge et al. |
| 6,356,801 B1 | 3/2002 | Goodman et al. |
| 6,389,432 B1 | 5/2002 | Pothapragada et al. |
| 6,397,166 B1 | 5/2002 | Leung et al. |
| 6,414,985 B1 | 7/2002 | Furukawa et al. |
| 6,418,478 B1 | 7/2002 | Ignatius et al. |
| 6,421,711 B1 | 7/2002 | Blumenau et al. |
| 6,438,595 B1 | 8/2002 | Blumenau et al. |
| 6,466,950 B1 | 10/2002 | Ono |
| 6,487,561 B1 | 11/2002 | Ofek et al. |
| 6,516,314 B1 | 2/2003 | Birkler et al. |
| 6,516,348 B1 | 2/2003 | MacFarlane et al. |
| 6,519,679 B2 | 2/2003 | Devireddy et al. |
| 6,538,669 B1 | 3/2003 | Lagueux, Jr. et al. |
| 6,542,468 B1 | 4/2003 | Hatakeyama |
| 6,542,972 B2 | 4/2003 | Ignatius et al. |
| 6,564,228 B1 | 5/2003 | O'Connor |
| 6,587,970 B1 * | 7/2003 | Wang et al. ................ 714/47.2 |
| 6,604,118 B2 | 8/2003 | Kleiman et al. |
| 6,611,849 B1 | 8/2003 | Raff et al. |
| 6,629,189 B1 | 9/2003 | Sandstrom |
| 6,643,801 B1 | 11/2003 | Jammu et al. |
| 6,658,436 B2 | 12/2003 | Oshinsky et al. |
| 6,658,526 B2 | 12/2003 | Nguyen et al. |
| 6,691,209 B1 | 2/2004 | O'Connell |
| 6,732,124 B1 | 5/2004 | Koseki et al. |
| 6,771,595 B1 | 8/2004 | Gilbert et al. |
| 6,792,472 B1 | 9/2004 | Otterness et al. |
| 6,820,035 B1 | 11/2004 | Zahavi |
| 6,839,724 B2 | 1/2005 | Manchanda et al. |
| 6,925,476 B1 | 8/2005 | Multer et al. |
| 7,035,880 B1 | 4/2006 | Crescenti et al. |
| 7,065,615 B2 | 6/2006 | Sugino et al. |
| 7,068,597 B1 | 6/2006 | Fijolek et al. |
| 7,082,441 B1 | 7/2006 | Zahavi et al. |
| 7,085,904 B2 | 8/2006 | Mizuno et al. |
| 7,093,012 B2 | 8/2006 | Olstad et al. |
| 7,093,089 B2 | 8/2006 | de Brebisson |
| 7,096,269 B2 | 8/2006 | Yamagami |
| 7,096,315 B2 | 8/2006 | Takeda et al. |
| 7,103,740 B1 | 9/2006 | Colgrove et al. |
| 7,106,691 B1 | 9/2006 | DeCaluwe et al. |
| 7,120,757 B2 | 10/2006 | Tsuge |
| 7,130,970 B2 | 10/2006 | Devassy et al. |
| 7,146,377 B2 | 12/2006 | Nowicki et al. |
| 7,158,985 B1 | 1/2007 | Liskov |
| 7,197,490 B1 | 3/2007 | English |
| 7,203,944 B1 | 4/2007 | van Rietschote et al. |
| 7,216,244 B2 | 5/2007 | Amano |
| 7,231,391 B2 | 6/2007 | Aronoff |
| 7,340,652 B2 | 3/2008 | Jarvis et al. |
| 7,343,356 B2 | 3/2008 | Prahlad et al. |
| 7,343,453 B2 | 3/2008 | Prahlad et al. |
| 7,343,459 B2 | 3/2008 | Prahlad et al. |
| 7,346,623 B2 | 3/2008 | Prahlad et al. |
| 7,346,751 B2 | 3/2008 | Prahlad et al. |
| 7,395,282 B1 | 7/2008 | Crescenti et al. |
| 7,401,064 B1 | 7/2008 | Arone et al. |
| 7,454,569 B2 | 11/2008 | Kavuri et al. |
| 7,461,101 B2 | 12/2008 | Hsu et al. |
| 7,461,230 B1 | 12/2008 | Gupta et al. |
| 7,469,262 B2 | 12/2008 | Baskaran et al. |
| 7,472,312 B2 | 12/2008 | Jarvis et al. |
| 7,502,902 B2 | 3/2009 | Sato et al. |
| 7,529,745 B2 | 5/2009 | Ahluwalia et al. |
| 7,533,181 B2 | 5/2009 | Dawson et al. |
| 7,546,364 B2 | 6/2009 | Raman et al. |
| 7,617,262 B2 | 11/2009 | Prahlad et al. |
| 7,617,321 B2 | 11/2009 | Clark |
| 7,644,245 B2 | 1/2010 | Prahlad et al. |
| 7,765,167 B2 | 7/2010 | Prahlad et al. |
| 7,904,681 B1 | 3/2011 | Bappe |
| 8,112,605 B2 | 2/2012 | Kavuri |
| 8,266,406 B2 * | 9/2012 | Kavuri .................... 711/170 |
| 8,306,926 B2 | 11/2012 | Prahlad et al. |
| 2002/0019909 A1 | 2/2002 | D'Errico |
| 2002/0120741 A1 | 8/2002 | Webb et al. |
| 2002/0124137 A1 | 9/2002 | Ulrich et al. |
| 2002/0143999 A1 | 10/2002 | Yamagami |
| 2002/0181395 A1 | 12/2002 | Foster et al. |
| 2002/0194526 A1 * | 12/2002 | Ulrich et al. ................ 714/6 |
| 2003/0005119 A1 | 1/2003 | Mercier et al. |
| 2003/0023743 A1 * | 1/2003 | Raphel et al. ............. 709/232 |
| 2003/0023893 A1 | 1/2003 | Lee et al. |
| 2003/0065759 A1 | 4/2003 | Britt et al. |
| 2003/0079018 A1 | 4/2003 | Lolayekar et al. |
| 2003/0126200 A1 | 7/2003 | Wolff |
| 2003/0161338 A1 | 8/2003 | Ng et al. |
| 2004/0006572 A1 | 1/2004 | Hoshino et al. |
| 2004/0006578 A1 | 1/2004 | Yu et al. |
| 2004/0078632 A1 | 4/2004 | Infante et al. |

(56) References Cited

U.S. PATENT DOCUMENTS

| | | |
|---|---|---|
| 2004/0117438 A1 | 6/2004 | Considine et al. |
| 2004/0133634 A1 | 7/2004 | Luke |
| 2004/0193625 A1 | 9/2004 | Sutoh |
| 2004/0225437 A1 | 11/2004 | Endo et al. |
| 2005/0060613 A1 | 3/2005 | Cheng et al. |
| 2005/0172073 A1 | 8/2005 | Voigt |
| 2005/0188109 A1 | 8/2005 | Shiga et al. |
| 2005/0228875 A1 | 10/2005 | Monitzer et al. |
| 2005/0246376 A1 | 11/2005 | Lu et al. |
| 2005/0254456 A1 | 11/2005 | Sakai |
| 2006/0010341 A1 | 1/2006 | Kodama |
| 2006/0047931 A1 | 3/2006 | Saika |
| 2006/0092861 A1 | 5/2006 | Corday et al. |
| 2006/0107089 A1 | 5/2006 | Jansz et al. |
| 2006/0171315 A1 | 8/2006 | Choi et al. |
| 2006/0174075 A1 | 8/2006 | Sutoh |
| 2006/0206662 A1 | 9/2006 | Ludwig et al. |
| 2006/0215564 A1 | 9/2006 | Breitgand et al. |
| 2007/0033368 A1 | 2/2007 | Taguchi et al. |
| 2007/0033437 A1 | 2/2007 | Kawamura et al. |
| 2007/0050547 A1 | 3/2007 | Sano |
| 2007/0055737 A1 | 3/2007 | Yamashita et al. |
| 2007/0088702 A1 | 4/2007 | Fridella et al. |
| 2007/0130373 A1 | 6/2007 | Kalwitz |
| 2007/0198797 A1 | 8/2007 | Kavuri et al. |
| 2007/0198802 A1 | 8/2007 | Kavuri |
| 2007/0260609 A1 | 11/2007 | Tulyani |
| 2007/0260834 A1 | 11/2007 | Kavuri et al. |
| 2008/0059704 A1 | 3/2008 | Kavuri |
| 2008/0114815 A1 | 5/2008 | Sutoh |
| 2008/0126704 A1 | 5/2008 | Ulrich et al. |
| 2008/0147878 A1 | 6/2008 | Kottomtharayil et al. |
| 2008/0177970 A1 | 7/2008 | Prahlad et al. |
| 2008/0177971 A1 | 7/2008 | Prahlad et al. |
| 2008/0205301 A1 | 8/2008 | Burton et al. |
| 2008/0228987 A1 | 9/2008 | Yagi |
| 2008/0250178 A1 | 10/2008 | Haustein et al. |
| 2008/0313497 A1 | 12/2008 | Hirakawa |
| 2009/0013014 A1 | 1/2009 | Kern |
| 2009/0089499 A1* | 4/2009 | Abe et al. .................. 711/112 |
| 2009/0113056 A1* | 4/2009 | Tameshige et al. ......... 709/226 |
| 2009/0300412 A1 | 12/2009 | Soran et al. |
| 2010/0312979 A1 | 12/2010 | Kavuri et al. |
| 2011/0010518 A1 | 1/2011 | Kavuri et al. |
| 2013/0007402 A1 | 1/2013 | Prahlad et al. |

FOREIGN PATENT DOCUMENTS

| | | |
|---|---|---|
| EP | 0467546 | 1/1992 |
| EP | 0774715 | 5/1997 |
| EP | 0809184 | 11/1997 |
| EP | 0899662 | 3/1999 |
| EP | 0981090 | 2/2000 |
| WO | WO 95/13580 | 5/1995 |
| WO | WO 99/12098 | 3/1999 |

OTHER PUBLICATIONS

Arneson, "Mass Storage Archiving in Network Environments" IEEE, 1998, pp. 45-50.

Cabrera, et al. "ADSM: A Multi-Platform, Scalable, Back-up and Archive Mass Storage System," Digest of Papers, Compcon '95, Proceedings of the 40th IEEE Computer Society International Conference, Mar. 5, 1995-Mar. 9, 1995, pp. 420-427, San Francisco, CA.

Eitel, "Backup and Storage Management in Distributed Heterogeneous Environments," IEEE, 1994, pp. 124-126.

Gait, "The Optical File Cabinet: A Random-Access File system for Write-Once Optical Disks," IEEE Computer, vol. 21, No. 6, pp. 11-22 (1988).

Jander, "Launching Storage-Area Net," Data Communications, US, McGraw Hill, NY, vol. 27, No. 4(Mar. 21, 1998), pp. 64-72.

Rosenblum et al., "The Design and Implementation of a Log-Structure File System," Operating Systems Review SIGPOPS, vol. 25, No. 5, New York, US, pp. 1-15 (May 1991).

European Examination Report Application No. 05745272.4, Mar. 9, 2010.

International Search Report, PCT/US2005/015202, dated Dec. 5, 2006.

Supplementary European Search Report, EP 05745272.2, dated Mar. 16, 2010, 3 pages.

Office Action in Canadian Application No. 2,564,967 dated Aug. 8, 2012.

* cited by examiner

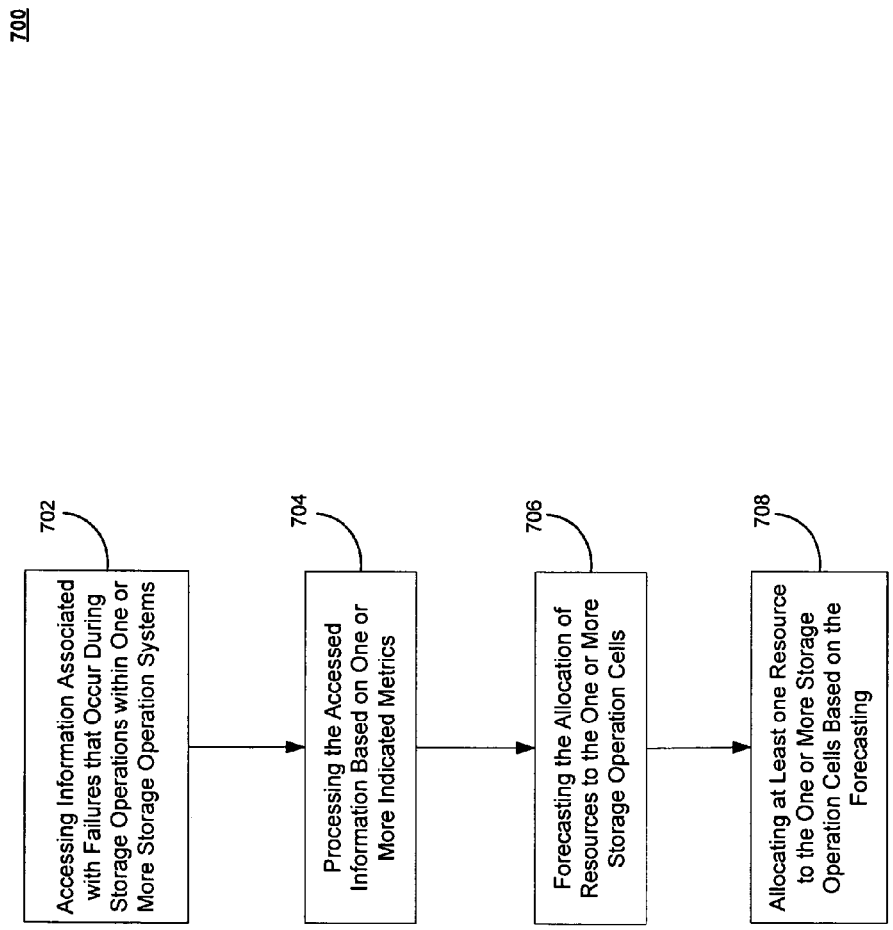

SYSTEM AND METHOD FOR ALLOCATION OF ORGANIZATIONAL RESOURCES

CROSS-REFERENCE TO RELATED APPLICATIONS

This application is a continuation of U.S. patent application Ser. No. 11/639,830, filed Dec. 15, 2006, entitled SYSTEM AND METHOD FOR ALLOCATION OF ORGANIZATIONAL RESOURCES, now U.S. Pat. No. 8,266,406, issued Sep. 11, 2012, which claims the benefit of U.S. Provisional Application Nos. 60/752,196, filed Dec. 19, 2005, and 60/752,197, filed Dec. 19, 2005, each of which is incorporated herein by reference in its entirety. U.S. patent application Ser. No. 11/639,830 is a continuation-in-part of U.S. application Ser. No. 11/120,619, filed May 2, 2005, entitled HIERARCHICAL SYSTEMS AND METHODS FOR PROVIDING A UNIFIED VIEW OF STORAGE INFORMATION, now U.S. Pat. No. 7,343,453, issued Mar. 11, 2008, which claims the benefit of U.S. Provisional Application No. 60/567,178, filed Apr. 30, 2004, each of which is incorporated herein by reference in its entirety.

BACKGROUND

The invention disclosed herein relates generally to performing storage operations on electronic data in a computer network. More particularly, the present invention relates to managing the allocation of resources in a storage operation system.

Current storage management systems employ a number of different methods to perform storage operations on electronic data. For example, data can be stored in primary storage as a primary copy or in secondary storage as various types of secondary copies including, as a backup copy, a snapshot copy, a hierarchical storage management copy ("HSM"), as an archive copy, and as other types of copies.

A primary, copy of data is generally a production copy or other "live" version of the data which is used by a software application and is generally in the native format of that application. Primary copy data may be maintained in a local memory or other high-speed storage device that allows for relatively fast data access if necessary. Such primary copy data is typically intended for short term retention (e.g., several hours or days) before some or all of the data is stored as one or more secondary copies, for example to prevent loss of data in the event a problem occurred with the data stored in primary storage.

Secondary copies include point-in-time data and are typically intended for long-term retention (e.g., weeks, months or years depending on retention criteria, for example as specified in a storage policy as further described herein) before some or all of the data is moved to other storage or discarded. Secondary copies may be indexed so users can browse and restore the data at another point in time. After certain primary copy data is backed up, a pointer or other location indicia such as a stub may be placed in the primary copy to indicate the current location of that data.

Based on the many storage operations that may be performed on primary, secondary, or other types of storage data, information associated with these storage operations may exists. For example, administrative users or managers of a storage operation system may wish to leverage such storage operation information to a better understanding of system operation.

SUMMARY

System and methods for storing electronic data are provided, wherein, in one embodiment, the system comprises a storage manager component and a management module associated with the storage manager component. The management module is configured to receive information related to storage activities associated with one or more storage operation components within the storage operation system under the direction of the storage manager component. The management module is adapted to predict storage operation resource allocations based on the received information related to the storage activities.

BRIEF DESCRIPTION OF THE DRAWINGS

The invention is illustrated in the figures of the accompanying drawings which are meant to be exemplary and not limiting, in which like references are intended to refer to like or corresponding parts, and in which:

FIG. 7 is a flow diagram of a method of utilizing reported failure information in one or more storage operation cells according to an embodiment of the invention;

DETAILED DESCRIPTION

Figure 1:
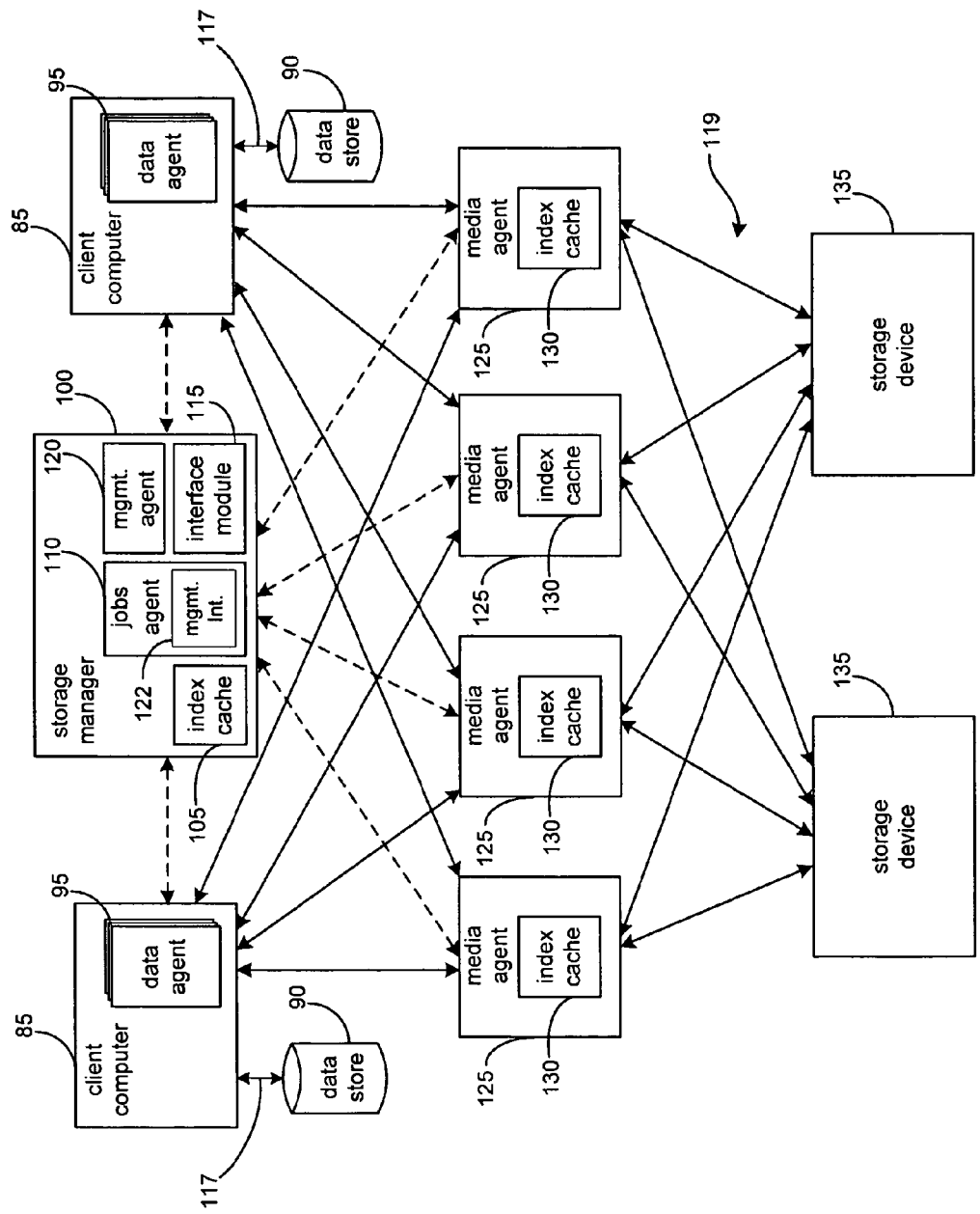
FIG. 1 is a block diagram of a storage operation cell in a system to perform storage operations on electronic data in a computer network according to an embodiment of the invention.

FIG. 1 presents a block diagram of a storage operation cell in a system to perform storage operations on electronic data in a computer network according to an embodiment of the invention. As shown, the storage operation cell includes a storage management component, such as storage manager 100 and one or more of the following: a client 85, a data store 90, a data agent 95, a media management component, such as a media agent 125, a media management component index cache 130, a storage device 135, a storage management component index cache 105, a jobs agent 110, an interface module 115, and a management agent 120. The system and elements thereof are exemplary of a modular storage management system such as that further described in application Ser. No. 09/610,738, which is incorporated herein by reference in its entirety. A storage operation cell may generally include combinations of hardware and software components directed to performing storage operations on electronic data. Exemplary storage operation cells according to embodiments of the invention include CommCells as embodied in the QNet storage management system and the QiNetix storage management system by CommVault Systems of Oceanport, N.J., and as further described in application Ser. No. 60/482,305 and application Ser. No. 09/354,058 which are hereby incorporated by reference in their entirety.

Storage operations cells may be related to backup cells and may provide all of the functionality of backup cells as further described in application Ser. No. 09/354,058. Storage operation cells may also perform additional types of storage operations and provided by other types of storage management functionality. Storage operation cells performing storage operations may also include, but are not limited to, creation, storage, retrieval, migration, deletion, and tracking of primary or production volume data, secondary volume data, primary copies, secondary copies, auxiliary copies, snapshot copies, backup copies, incremental copies, differential copies, Hierarchical Storage Management ("HSM") copies, archive copies, Information Lifecycle Management ("ILM") copies, and other types of copies and versions of electronic data. Storage operation cells may also include an integrated management console for providing users or system processes to interface with, in order to perform storage operations on electronic data.

A storage operation cell may be organized and associated with other storage operation cells by forming a logical hierarchy among various components of a storage management system. Storage operation cells generally include a storage manager 100, and, one or more other components including, but not limited to, a client computer 85, a data agent 95, a media management component 125, a storage device 135, such as a single instance storage device, and other components.

For example, a storage operation cell may contain a data agent 95 which may generally be-a software module that is responsible for performing storage operations related to client computer 85 data that may be stored in data store 90 or another memory location. For example, data agent 95 may provide archiving, migrating, and recovery of client computer data. A data agent may perform storage operations in accordance with one or more storage policies or other preferences. A storage policy is generally a data structure or other information which includes a set of preferences and other storage criteria for performing a storage operation. The preferences and storage criteria may include, but are not limited to, a storage location, relationships between system components, network pathway to utilize, retention policies, data characteristics, compression or encryption requirements, preferred system components to utilize in a storage operation, and other criteria relating to a storage operation. Storage policies may be stored to a storage manager index 105, to archive media as metadata for use in restore operations or other storage operations, or to other locations or components of the system.

Each client computer 85 generally has at least one data agent 95 and the system may support many client computers 85. The system may also generally provide a plurality of data agents 95 each of which may intend to perform storage operations related to data associated with a different application, for example, in order to backup, migrate, and recover application specific data. For example, different individual data agents 95 may be designed to handle MICROSOFT EXCHANGE data, LOTUS NOTES data, MICROSOFT WINDOWS 2000 file system data, MICROSOFT ACTIVE DIRECTORY OBJECTS data, and other types of data known in the art.

If a client computer 85 includes two or more, types of data, one data agent 95 may generally be required for each data type in order to perform storage operations related to client computer 85 data. For example, to backup, migrate, and restore all of the data on a MICROSOFT EXCHANGE 2000 server, the client computer 85 would use one MICROSOFT EXCHANGE 2000 mailbox data agent 95 to backup the EXCHANGE 2000 mailboxes, one MICROSOFT EXCHANGE 2000 database data agent 95 to backup the Exchange 2000 databases, one MICROSOFT EXCHANGE 2000 public folder data agent 95 to backup the EXCHANGE 2000 public folders, and one MICROSOFT WINDOWS 2000 file system data agent 95 to backup the client computer's 85 file system. These data agents 95 may be treated as four separate data agents 95 by the system even though they reside on the same client computer 85. Separate data agents may be combined to form a virtual data agent (not shown) for performing storage operations related to a specific application. Thus, the four separate data agents of the previous example may be combined as a virtual data agent suitable for performing storage operations related to all types of MICROSOFT EXCHANGE 2000 and/or WINDOWS 2000 data.

The storage manager 100 may generally be a software module or application that coordinates and controls storage operations performed by the storage operation cell. The storage manager 100 may communicate with all elements of the storage operation cell including client computers 85, data agents 95, media management components 125, and storage devices 135 regarding storage operations, for example, to initiate and manage system backups, migrations, and recoveries. The storage manager 100 may also communicate with other storage operation cells.

The storage manager 100 may include a jobs agent 110 software module which monitors the status of all storage operations that have been performed, that are being performed, or that are scheduled to be performed by the storage operation cell. The jobs agent 110 may be communicatively coupled with an interface agent 115 software module. The interface agent 115 may provide presentation logic, such as a graphical user interface ("GUI"), an application program interface ("API"), or other interface by which users and system processes may be able to retrieve information about the status of storage operations and issue instructions regarding the performance of storage operations. For example, a user may modify the schedule of a number of pending snapshot copies or other types of copies. As another example, a user may use the GUI to view the status of all storage operations currently pending in all storage operation cells or the status of particular components in a storage operation cell.

Storage system management information may include, but is not limited to, the status of various storage operations (past and present), storage operation policies, storage operation scheduling, the configuration (e.g., associations) of components (e.g., media agents 125, storage devices 135, clients 85, data agent 95, etc.) within the storage operation system, the number of storage operation jobs carried out by each of the storage operation system components, failure and load balancing information, network capacity information across various communication links (e.g., links 117, 119), and other data management related information. Such information may be stored in index 105, and associated metabase, and/or any other storage devices associated with storage manager 100.

A management interface module 122 within jobs agent component 110 may facilitate the accessing and processing of system information. In addition to allowing users of the storage operation system (e.g., system administrators) to monitor, control, and retrieve such information, management interface module 122 may generate reports indicative of system operation which may include past, present or predictive information relating to system performance. One or more users of a storage operation system may access a unified view of system management information from management module 122 via interface module 115. Based on this accessed information, various trending procedures and process may be carried in order predict the growth requirements of the one or more storage operation cells in a storage operation system. As previously described, interface 115 may include a GUI, API, or other graphical interface device capable of displaying, entering, and/or editing system management information to users such as storage system administrators.

As illustrated in FIG. 1, management interface module 122 may be a module residing within jobs agent 110. Alternatively, management interface module 122 may be a separate module within storage manager 100. Also, management interface module 122 may include a separate module in communication with storage manager 100 via management agent 120. For example, management interface module 122 may receive storage management related information from different modules with the storage operation cell, such as, data agents 95, media agents 125, storage devices 135, network traffic evaluation devices, and/or any other hardware devices, software modules, or combinations thereof, that may have or generate performance related data or metrics based on storage operation activities (e.g., copy operations, data migration, backups, etc.) with the storage operation cells of a storage operation system.

The storage manager 100 may also include a management agent 120 software module. The management agent 120 may generally provide an interface with other management components 100 in other storage operations cells through which information and instructions regarding storage operations may be conveyed. For example, a management agent 120 in a first storage operation cell can communicate with a management agent 120 in a second storage operation cell regarding the status of storage operations in the second storage operation cell. A management agent 120 in a first storage operation cell can communicate with a management agent 120 in a second storage operation cell to control the storage manager 100 (and other components) of the second storage operation cell via management agent 120 contained in the storage manager 100 of the second storage operation cell. The management agent 120 in the first storage operation cell may communicate directly with and control the components in the second storage management cell and bypasses the storage manager 100 in the second storage management cell. Storage operation cells can thus be organized hierarchically among cells.

A media management component 125 may be a software module that conducts data, as directed by a storage manager 100, between client computers 85 and one or more storage devices 135. The media management component 125 may communicatively be coupled with and generally configured to control one or more storage devices 135. For example, the media management component 125 may instruct a storage device 135 to use a robotic arm or other means to load or eject a media cartridge, and to archive, migrate, or restore application specific data. The media management component 125 may generally communicate with storage devices 135 via a local bus such as a SCSI adaptor. In some embodiments, the storage device 135 may be communicatively coupled to the media management component 125 via a Storage Area Network ("SAN").

Each media management component 125 may maintain an index cache 130 which stores index data the system generates during storage operations as further described herein. For example, storage operations for MICROSOFT EXCHANGE data generate index data. Index data may include, for example, information regarding the location of the stored data on a particular media, information regarding the content of the data stored such as file names, sizes, creation dates, formats, application types, and other file-related criteria, information regarding one or more clients associated with the data stored, information regarding one or more storage policies, storage criteria, or storage preferences associated with the data stored, compression information, retention-related information, encryption-related information, stream-related information, and other types of information. Index data may thus provides the system with an efficient mechanism for performing storage operations including locating user files for recovery operations and for managing and tracking stored data. The system generally maintains two copies of the index data regarding particular stored data. A first copy may generally be stored with the data copied to a storage device 135. Thus, a tape may contain the stored data as well as index information related to the stored data. In the event of a system restore, the index data stored with the stored data may be used to rebuild a media management component index 130 or other index useful in performing storage operations. In addition, the media management component 125 that controls the storage operation may also write an additional copy of the index data to its index cache 130. The data in the media management component index cache 130 may be generally stored on faster media, such as magnetic media, and is thus readily available to the system for use in storage operations and other activities without having to be first retrieved from the storage device 135.

Storage manager 100 may also maintains an index cache 105. Storage manager index data may be used to indicate, track, and associate logical relationships and associations between components of the system, user preferences, management tasks, and other useful data. For example, the storage manager 100 may use its index cache 105 to track logical associations between media management components 125 and storage devices 135. The storage manager 100 may also use its index cache 105 to track the status of storage operations to be performed, storage patterns associated with the system components such as media use, storage growth, network bandwidth, Service Level Agreement ("SLA") compliance levels, data protection levels, storage policy information, storage criteria associated with user preferences, retention criteria, storage operation preferences, and other storage-related information. Index caches 105 and 130 may typically reside on their corresponding storage component's hard disk or other fixed storage device.

For example, the jobs agent 110 of a storage manager component 100 may retrieve storage manager index 105 data regarding a storage policy and storage operation to be performed or scheduled for a particular client 85. Jobs agent 110, either directly or via the interface module 115, may communicate with the data agent 95 at the client 85 regarding the storage operation. In some embodiments, the jobs agent 110 may also retrieve from the index cache 105 a storage policy associated with the client 85 and uses information from the storage policy to communicate to the data agent 95 one or more media management components 125 associated with performing storage operations for that particular client 85 as well as other information regarding the storage operation to be performed, such as retention criteria, encryption criteria, streaming criteria, etc. The data agent 95 may then package or otherwise manipulate the client data stored in the client data store 90 in accordance with the storage policy information and/or according to a user preference, and communicates this client data to the appropriate media management component(s} 125 for processing. Media management component(s) 125 may store the data according to storage preferences associated with the storage policy including storing the generated index data with the stored data, as well as storing a copy of the generated index data in the media management component index cache 130.

In some embodiments, components of the system may reside and execute on the same computer. In some embodiments, a client computer 85 component such as a data agent 95, a media management component 125, or a storage manager 100 may coordinate and direct storage operations as further described in application Ser. No. 09/610,738. This client computer 85 component can function independently or together with other similar client computer 85 components.

Figure 2:
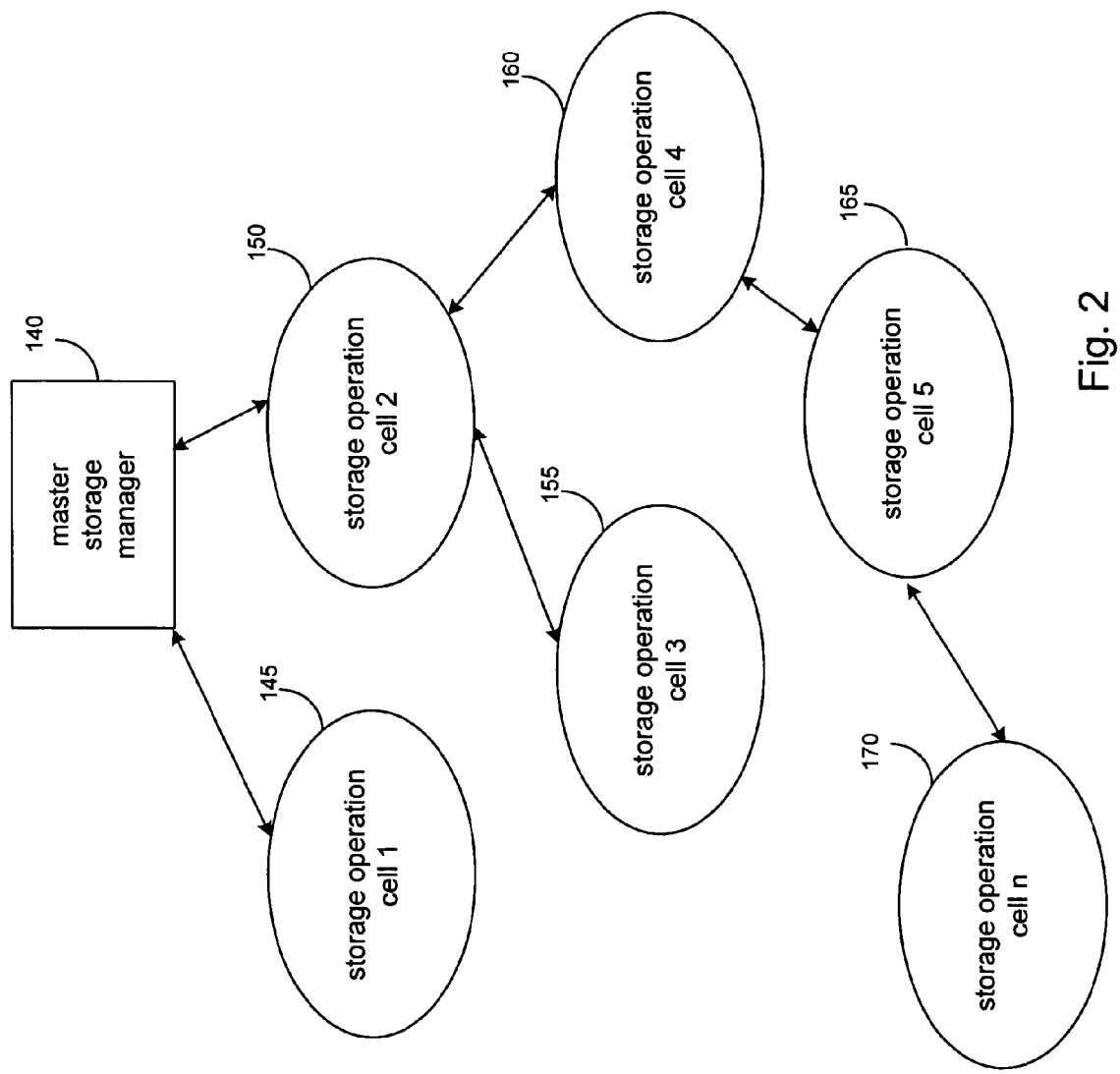
FIG. 2 is a block diagram of a hierarchically organized group of storage operation cells in a system to perform storage operations on electronic data in a computer network according to an embodiment of the invention.

FIG. 2 presents a block diagram of a hierarchically organized group of storage operation cells in a system to perform storage operations on electronic data in a computer network according to an embodiment of the invention. As shown, the system may include a master storage manager component 140, a first storage operation cell 145, a second storage operation cell 150, a third storage operation cell 155, a fourth storage operation cell 160, a fifth storage operation cell 165, and an nth storage operation cell 170.

As previously described, storage operation cells may often be communicatively coupled and hierarchically organized. For example, as shown in FIG. 2, master storage manager 140 may be associated with, communicates with, and directs storage operations for a first storage operation cell 145, a second storage operation cell 150, a third storage operation cell 155, a fourth storage operation cell 160, a fifth storage operation cell 165, and an nth storage operation cell 170. In some embodiments, master storage manager 140 may not be part of any particular storage operation cell. In other embodiments (not shown), master storage manager 140 may itself be part of a storage operation cell.

Thus, master storage manager 140 may communicate with the management agent of the storage manager of the first storage operation cell 145 (or directly with the other components of the first cell 145) regarding storage operations performed in the first storage operation cell 145. For example, in some embodiments, the master storage manager 140 may instruct the first storage operation cell 145 how and when to perform storage operations, including the type of operation to perform, and the data on which to perform the operation.

In other embodiments, master storage manager 140 may track the status of its associated storage operation cells, such as the status of jobs, system components, system resources, and other items, by communicating with manager agents (or other components) in the respective storage operation cells. In other embodiments, master storage manager 140 may track the status of its associated storage operation cells by receiving periodic status updates from the manager agents (or other components) in the respective cells regarding jobs, system components, system resources, and other items. For example, in some embodiments, master storage manager 140 may use methods to monitor network resources such as mapping network pathways and topologies to, among other things, physically monitor storage operations and suggest alternate routes for storing data as further described herein. The master storage manager 140 may also use methods to monitor primary and secondary storage trends, storage status, media usage, data protection levels, and other storage-related information as further described herein.

In some embodiments, master storage manager 140 may store status information and other information regarding its associated storage operation cells and the system in an index cache or other data structure accessible to the master storage manager 140. In some embodiments, as further described herein, the presentation interface of the master storage manager 140 accesses this information to present users and system processes with information regarding the status of storage operations, storage operation cells, system components, and other information of the system.

Storage operation cells may thus be organized hierarchically. Thus, storage operation cells may inherit properties from their parents or be controlled by other storage operation cells in the hierarchy. Thus, in some embodiments as shown in FIG. 2, the second storage operation cell 150 controls or is otherwise superior to the third storage operation cell 155, the fourth storage operation cell 160, the fifth storage operation cell 165, and the nth storage operation cell 170. Similarly, the fourth storage operation cell 160 controls the fifth storage operation cell 165, and the nth storage operation cell 170.

Storage operation cells may also be organized hierarchically according to criteria such as function, geography, architectural considerations, or other factors useful in performing storage operations. For example, in one embodiment storage operation cells may be organized according to types of storage operations: the first storage operation cell 145 may be directed to performing snapshot copies of primary copy data, and the second storage operation cell 150 is directed to performing backup copies of primary copy data or other data. For example, in another embodiment, the first storage operation cell 145 may represent a geographic segment of an enterprise, such as a Chicago office, and a second storage operation cell 150 represents a different geographic segment, such as a New York office. In this example, the second storage operation cell 150, the third storage operation cell 155, the fourth storage operation cell 160, the fifth storage operation cell 165, and the nth storage operation cell 170 may represent departments within the New York office. Alternatively, these storage operation cells may be further divided by function performing various types of copies for the New York office or load balancing storage operations for the New York office.

In some embodiments, hierarchical organization of storage operation cells facilitates, among other things, system security and other considerations. For example, in some embodiments, only authorized users may be allowed to access or control certain storage operation cells. For example, a network administrator for an enterprise might have access to all storage operation cells including the master storage manager 140. However, a network administrator for only the New York office, according to a previous example, may only satisfy access criteria for gaining access to the second storage operation cell 150, the third storage operation cell 155, the fourth storage operation cell 160, the fifth storage operation cell 165, and the nth storage operation cell 170 which may comprise the New York office storage management system.

In some embodiments, hierarchical organization of storage operation cells facilitates storage management planning and decision-making. For example, in some embodiments, a user of the master storage manager 140 may view the status of all jobs in the associated storage operation cells of the system as well as the status of each component in every storage operation cell of the system. The user can may then plan and make decisions based on this global data. For example, the user may view high-level reports of summary information regarding storage operations for the entire system, such as job completion status, component availability status, resource usage status (such as network pathways, etc.), and other information. The user may also drill down through menus or use other means to obtain more detailed information regarding a particular storage operation cell or group of storage operation cells.

In other embodiments, master storage manager 140 may alert the user when a particular resource is unavailable or congested. A storage device may be at or near capacity or require additional storage media. Alternatively, a storage manager in a particular storage operation cell may be unavailable due to hardware failure, software problems, or other reasons. In some embodiments, master storage manager 140 (or another storage manager within the hierarchy of storage operation cells) may utilize the global data regarding its associated storage operation cells at its disposal to suggest solutions to such problems prior to occurrence. For example, the master storage manager 140 may alert the user that a storage device in a particular storage operation cell was full or otherwise congested, and then suggest, based on job and data storage information contained in its index cache, an alternate storage device.

Master storage manager 140 (or other network storage manager) may contain programming directed to analyzing the storage patterns and resources of its associated storage operation cells and which suggests optimal or alternate methods of performing storage operations. Thus, for example, master storage manager 140 may analyze traffic patterns in order to determine that snapshot data should be sent via a different network segment or to a different storage operation cell or storage device. In some embodiments, users may direct specific queries to master storage manager 140 regarding predicting storage operations or regarding storage operation information.

FIG. 3 is a block diagram of a hierarchically organized group of storage operation cells in a system to perform storage operations on electronic data in a computer network according to an embodiment of the invention. As shown, FIG. 3 may include a first storage operation cell 175, a second storage operation cell 180, a third storage operation cell 185, a client 190 in communication with a primary volume 195 storing production or other "live" data, a storage manager component 200 in communication with a storage manager index data store 205, a media management component 210 in communication with a media management component index 215, a secondary storage device or volume 220, and a master storage manager component 225 in communication with a master storage manager index data store 230.

According to an embodiment of the invention, the first storage operation cell 175 may be directed to a particular type storage operation, such as SRM storage operations. For example, the first storage operation cell 175 may monitor and perform SRM-related calculations and operations associated with primary volume 195 data. Thus, the first storage operation cell 175 may include a client component 190 in communication with a primary volume 195 storing data. For example, client 190 may be directed to using EXCHANGE data, SQL data, ORACLE data, or other types of production data used in business applications or other applications and stored in primary volume 195. Storage manager component 200 in cell 175 may contain SRM modules or other logic directed to monitoring or otherwise interacting with attributes, characteristics, metrics; and other information associated with the data stored in primary volume 195. Storage manager 200 may track and store this information and other information in storage manager index 205. For example, in some embodiments, storage manager component 200 may track the amount of available space and other similar characteristics of data associated with primary volume 195. In some embodiments, as further described herein, storage manager component 200 may also issue alerts or take other actions when the information associated with primary volume 195 satisfies certain criteria (e.g., alert criteria (e.g., breach of storage capacity threshold levels).

In addition to storing alert criteria and storage data characteristics, storage manager 200 in cell 175 may also track and save (e.g., within index 205) other system management information. For example, information associated with various aspects of storage operation activities within cell 175 may be accessed by storage manager 200 and stored in index 205.

For example, the information associated with storage activities may include, but is not limited to, a logged time stamp for each performed storage operation; storage capacity used during each storage operation; status of storage operation (e.g., partial or full failure); pathways taken over one or more communication links (e.g., link 240) between client 190 and primary storage 195 during each storage operation; aggregate storage capacity available within storage device 195, number of clients 190 within storage cell 175; number of storage devices (e.g., storage 195 and index 205) within storage operation cell 175; and network congestion information associated with each pathway over which a storage operation is performed. Storage manager 200 may periodically send such stored system management information to a master storage manager such as storage manager 225 in storage operation cell 175. Alternatively, master storage manager 225 may poll storage manager 200 of cell 175 and/or other storage manager components (e.g., storage manager 200 of storage operation cell 180) in order to access system management information.

The storage manager 200 in storage operation cell 175 may include a management interface module such as management interface 122 shown in FIG. 1. If so, the management interface may access the system management information from index 205 for processing. Once processed, various forecasting information associated with the storage resources in storage cell 175 may be determined and sent to master storage manager 225. For example, based on previous storage capacity trends and available storage capacity associated with storage device 195, the management interface (not shown) may predict a need for added storage capacity within three weeks.

Thus, in the provided example, the predicted storage needs may provide a measure of growth rate associated with a storage resource such as primary storage 195, which may provide system administrators and managers with an opportunity to allocate new and/or alternative resources prior to a point in time when the resource may no longer be available. In another example, information related to traffic on a data pathway may be monitored in order to develop a trend in failure conditions versus data traffic on a specific pathway at different times. Thus, based on this information, the management interface module may, for example, users with the opportunity to select additional or alternative data pathways at times when data transmissions over a particular pathway previously lead to a failure in storage operations. In some embodiments, the storage manager may automatically assign the appropriate resources according to the processing of the system management information by its respective management interface module (e.g., in the case were data loss or system failure is imminent or to part of an ongoing optimization process, etc).

The second storage operation cell 180 may be directed to another type storage operation, such as HSM storage operations. For example, second storage operation cell 180 may perform backups, migrations, snapshots, or other types of HSM-related operations known in the art. For example, in some embodiments, data may be migrated from faster and more expensive storage such as magnetic storage to less expensive storage such as tape storage.

In some embodiments, storage operation cells may also contain logical groupings of the same physical devices. Thus, the second storage operation cell 180 may include client component 190 in communication with primary volume 195 for storing data, and client component 190 and primary volume 195 in the second storage operation cell 180 may be the same physical devices as the client component 190 and primary volume 195 in the first storage operation cell 175. Similarly, in some embodiments, storage manager component 200 and index 205 in the second storage operation cell 180 may be the same physical devices as the storage manager component and index in the first storage operation cell 175. Storage manager component 200 may, however, also contain HSM modules or other logic associated with second storage operation cell 180 that may be directed to performing HSM storage operations on primary volume 195 data.

The second storage operation cell 180, therefore, may also contain a media management component 210, a media management component index 215, and a secondary storage volume 220 directed to performing HSM-related operations on primary copy data. For example, storage manager 200 may migrate primary copy data from primary volume 195 to secondary volume 220 using media management component 210. Storage manager 200 may also track and store information associated with primary copy migration and other similar HSM-related operations in storage manager index 205. For example, in some embodiments, storage manager component 200 may direct HSM storage operations on primary copy data according to a storage policy associated with primary copy 195 and stored in index 205. In some embodiments, storage manager 200 may also track where primary copy information is stored, for example, in secondary storage 220.

Storage manager 200 in cell 180 may also track and save (e.g., within index 205) system management information associated with various aspects of storage operation activities. For example, the information associated with storage activities may include, but is not limited to, a logged time stamp for each performed storage operations; storage capacity used during each storage operation; status of storage operations (e.g., partial or full failure); pathways taken over one or more communication links (e.g., link 240) between client 190, media agent 210, and secondary storage 220 during each storage operation; pathways taken over one or more communication links (e.g., links 245 and 250) between client 190 and primary storage 195 during each storage operation; aggregate storage capacity available within storage device 195; number of clients 190 within storage cell 180; number of storage devices (e.g., storage devices 195, 220, and 205) within storage operation cell 180; number of media agents 210 within storage cell 180; and network congestion information associated with each pathway over which a storage operation is performed. Storage manager 200 may periodically send such stored system management information to a master storage manager such as storage manager 225 in storage operation cell 180. Alternatively, master storage manager 225 may poll storage manager 200 of cell 180 and/or other storage manager components (e.g., storage manager 200 of storage operation cell 175) in order to access such system management information.

The storage manager 200 in storage operation cell 180 may also include a management interface module such as management interface 122 shown in FIG. 1. The management interface that may include reporting and analysis software component that may search for and retrieve certain system management information from portions of the system including, for example, index 205 or an associated metabase (not shown) indicative of system performance. The reporting software may analyze this information to generate certain reports that may reveal trends in system operation such as the use of certain system resources over time, observed and projected system growth, resource utilization rate, failure and congestion rates, performance information for specific groups of resources, etc. This allows system users to identify, track and predict performance and operational trends within the system providing operational visibility, allowing users to manage system configuration and resources effectively.

For example, based on information regarding previous storage capacity usage and available storage capacity of one or more secondary storage devices 220, the reporting and analysis software component may analyze and forecast a need for added storage capacity within a certain period of time (e.g., two months). Thus, the predicted storage needs may be indicative of growth rate associated with a particular storage resource such as storage device 220, which may provide system administrators with an opportunity to allocate additional and/or alternative resources such as additional storage media prior to a point in time when the resource is no longer viable.

In another example, information associated with the number of storage operations performed and the number of active media agents 210 coordinating those storage operations in certain cells 180 may be retrieved and analyzed by the reporting software. The results of such an analysis may provide a system administrator with information regarding resource usage including emerging patterns and trends providing an opportunity to identify bottlenecks or stress points and configure, assign or allocate additional media agents to cope with changing conditions. For example, if certain media agents are operating at or near full capacity, additional ones may be added. In this example, if certain other media agents are operating significantly below full capacity, storage operations from over burdened media agents may moved to these media agents to load balance. In some embodiments, the system may automatically perform these tasks without user input (e.g., in an emergency situation when failure or data loss are imminent, or as part of an ongoing process to optimize system performance or enhance efficiency, etc.).

The third storage operation cell 185 may contain a master storage manager 225 and a master storage manager index 230. In some embodiments (not shown), additional storage operation cells may be hierarchically located between the third storage operation cell 185 and the first storage operation cell 175 or the second storage operation cell 180. In some embodiments, additional storage operation cells hierarchically superior to the third storage operation cell 185 may also be present in the hierarchy of storage operation cells.

In some embodiments, the third storage operation cell 185 may also be directed to performing a type of storage operation, such as integration of SRM and HSM data from other storage operation cells, such as first storage operation cell 175 and second storage operation cell 180. In other embodiments, the third storage operation cell 185 may also perform other types of storage operations and may also be directed to HSM, SRM, or other types of storage operations. In some embodiments, the master storage manager 225 of the third storage operation cell 185 may aggregate and process network and storage-related data provided by other manager components 200 in other storage operation cells 175 and 180 in order to provide, among other information, reporting information regarding particular cells, groups of cell, or the system as a whole.

For example, master storage manager 225 in storage operation cell 185 may also include a management interface module such as management interface 122 shown in FIG. 1 which may include a reporting and analysis component. This management interface (not shown) may access management information received from both storage manager 200 in cell 175 and storage manager 200 in storage cell 180. Master storage manager 225 may, therefore, provide system administrators with a unified view of all storage operation cells within a configured storage operation system.

Although each storage operation cell may process system management information via a respective management interface module (e.g., generating performance metrics, trending, forecasting, and resource allocation), processing of system management information may be provided centrally at master storage manager 225. In such embodiments, system management information may be sent by the storage manager of each storage operation cell (e.g., storage manager 200 of cell 175) to master storage manager 225 following each storage operation. Alternatively, master storage manager 225 may periodically poll storage certain operation cells for system management information based on the report or analysis to be performed.

Figure 3A:
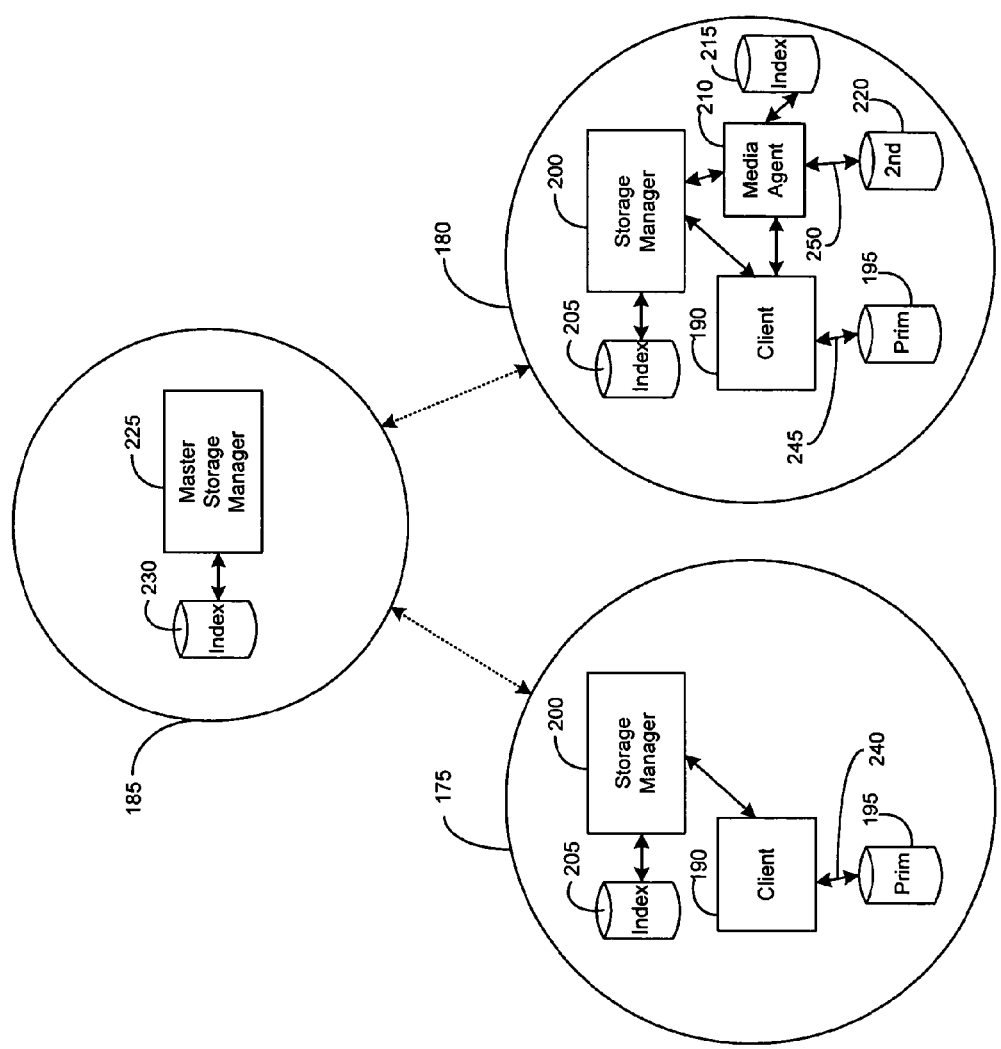
FIG. 3A is a block diagram of a hierarchically organized group of storage operation cells in a system to perform storage operations on electronic data in a computer network according to an embodiment of the invention.
Figure 3B:
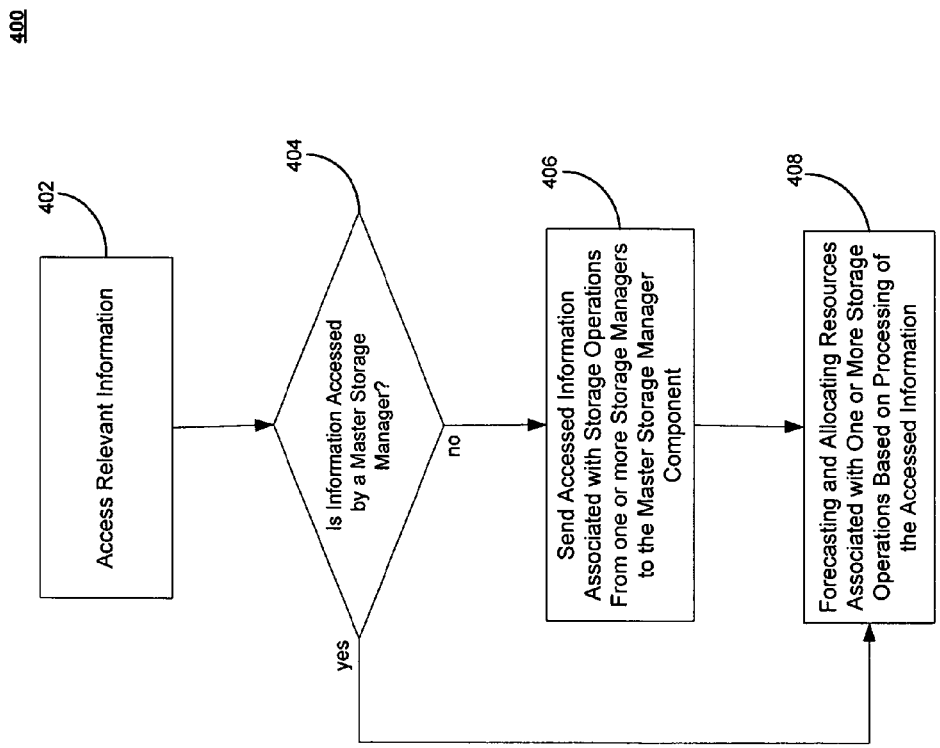
FIG. 3B is a flow diagram of a method of utilizing storage operation information in one or more storage operation cells according to an embodiment of the invention.

FIG. 3B is a flow diagram 400 generally illustrating some steps involved in using storage operation information (e.g., system management information) to generate certain reports or metrics according to an embodiment of the invention. At step 402, information associated with various storage operations within a storage operation cell may be tracked and stored by the storage manager, media agent or other media management component associated with one or more storage operation cells. For example, certain system management information such as information regarding the data or information copied (e.g., data size, type, packaging or other format details, security, location, destination, size, etc.), the time and date associated with past, present or future the storage operation, the policy responsible for initiating the storage operation, the pathway used Ito be used complete the storage operation, the components involved to be involved in the storage operation, and the status of the storage operation etc.

In some embodiments, this information may present in an index, database, metabase or other information storage device associated with one or more master storage managers or other media management components associated with one or more storage operation cells. Thus, in operation, a computing device (not shown) performing the calculations associated with a report may request and collect information from various master storage managers regarding certain information relating to metrics to be calculated (described further herein) (step 404). Once collected, this information may be processed to generate a specified report or obtain the desired performance metric(s). This may include providing forecasting and trending analyses as further described herein that may be used for identifying stress points within the system which may be used to assist in resource allocation (dynamic, automatic or manual) in one or more other storage operation cells (e.g., cells 175 and 180) associated with the master storage operation cell (step 408).

In other embodiments, information regarding system performance may be collected from various media management components within storage operation cells and reported to an associated master storage manager which may fulfill request as described above or be reported directly to the computing device requesting such information. In such embodiments, the computing device may consult with a master storage manager to locate media management components that have information of interest. The computing device may thus consult multiple storage operation cells in search of relevant information, collate and/or arrange the relevant information for subsequent processing to generate requested reports or metrics.

At step 404, it may be determined whether certain information is stored in or available in one or more master storage managers (e.g., master storage manager 225 shown in FIG. 3A). If so, the information may be retrieved and processed accordingly. This may involve initially polling or otherwise communicating with master storage managers within the system (or specified subset with in the system) to identify storage operation cells with information relevant to calculating desired metrics. A list of such cells may be created and used as a starting point in collecting relevant metric information. If however, it is determined that the information is not present in one or more master storage manager(s), the information may be retrieved from one or more media management components in a similar manner (step 406). A computing device including metric calculation software and an optional user interface may generate reports and provide forecasting and resource allocation operation based on the accessed information received from these storage manager components (step 408). Such reports may be presented to a user for consideration or may be analyzed by system management software monitoring system performance.

Figure 4A:
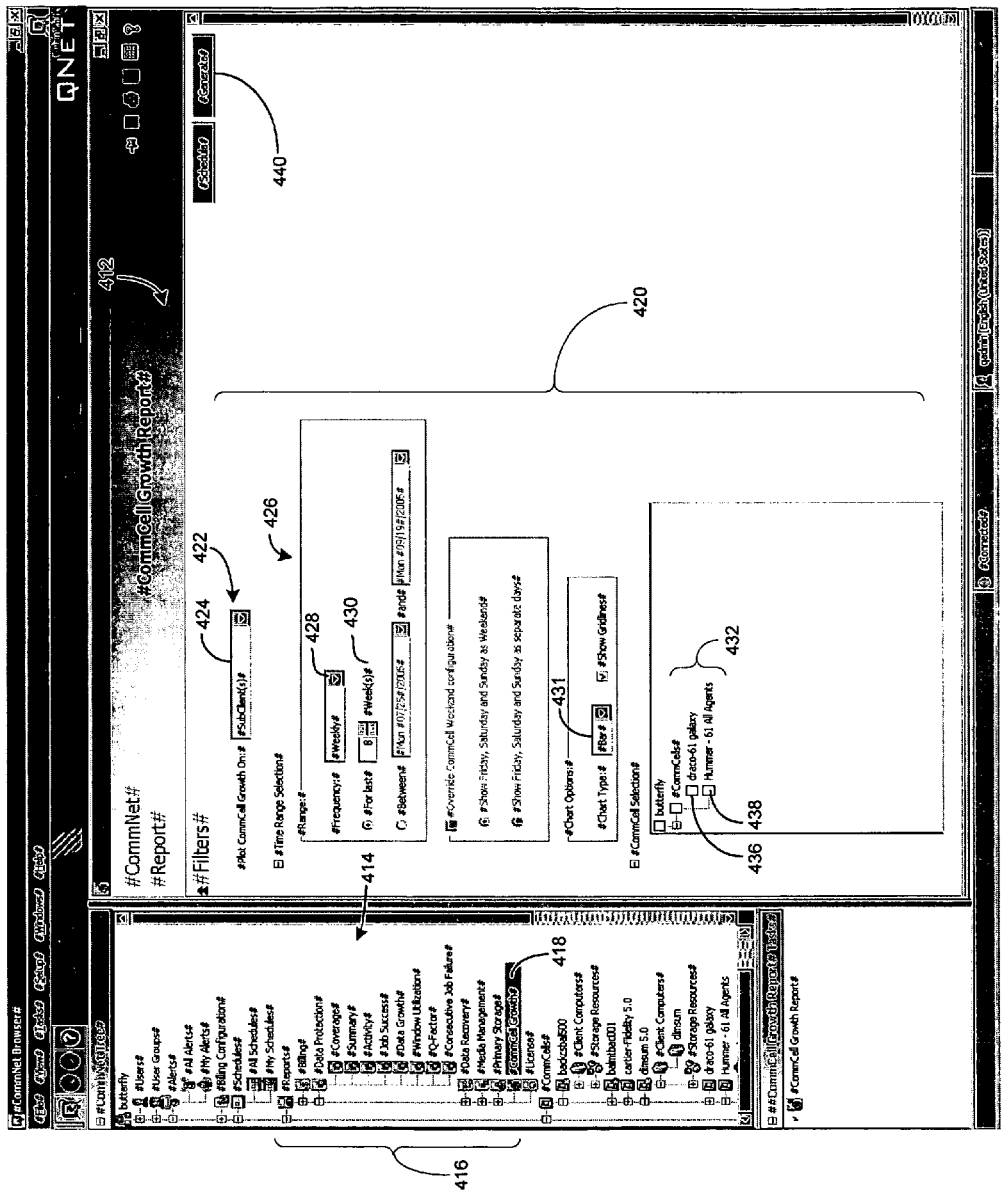
FIG. 4A is an illustrative interface screen for entering report generation scheduling information for trending and resource forecasting in accordance with one embodiment of the invention.

FIG. 4A shows an illustrative interface screen 412 that may be generated by reporting and analysis software for performing certain calculations based on system performance information according to an embodiment of the invention. For example, screen 412 may be generated by management interface module 122 (FIG. 1), and presented to users via interface module 115 (FIG. 1). As shown, the left side of screen 412 may include a directory tree 414 or other menu structure that allows users to access and manage different parts of a storage operation system from a unified display. For example, directory tree 414 may include a "reports" field 416, which may, among other things, provide users with the ability to request and monitor report results associated with various aspects of the storage operation system.

Selecting a report from field 416 may cause the system to generate provide a user display 420 allowing a user to specify parameters and generate certain reports regarding a particular category or occurrence of interest. Such reports may be preprogrammed by a vendor and/or created by an end user through reports generation tool (not shown) using techniques and procedures known in the art.

As shown, such reports may include, but are not limited to Billing, Data Protection, Data Recovery, Primary Storage or Commcell Growth and may include multiple subcategories as shown in connection with Data Protection reports on the left hand side of screen 412. However, it will be understood that these reports are only illustrative and that any other reports relating to system operation or performance may be added if desired. By selecting, for example, "CommCell Growth" element 418 from reports field 416, display 420 may be presented to the user. In some embodiments, users may enter certain specifics as filter parameters that provide or generate criteria that specifying data or occurrences of interest. For example, display 420 may include menu option 422 for selecting components or modules of the storage operation system that may be used in generating certain reports associated with the selected components or modules. For example, as illustrated in the embodiment of FIG. 4A, subclient(s) 424 has been selected.

Display 420 may include various time range selection options 426. For example, a user may select a report that provides information based on a certain frequency (e.g., a weekly basis) and/or over a specified time range (e.g., over last 8 weeks). Thus, frequency option 428 and range option 430 may specify a report generated based on subclient related information collected on a weekly basis (i.e., based on option 428) over a specified eight-week period (i.e., based on option 430). In other embodiments, a range of dates may be specified if desired.

Using an output or result field 431, a user may specify that a certain format for displaying results that may include various graphical displays for displaying report results. In the provided example, a bar graph display is selected, however any suitable layout may selected of desired (e.g., a pie chart, a line plot across and x-y axis, etc.). A report may be generated for subclients of a particular storage operation cell or other selected storage operation cells using selection field 432. Thus, as shown in exemplary screen 412, specific storage operation cells 436 and 438 may be selected and included in a subsequently generated report. After specifying the information certain information, By clicking on "Generate" button 440 in screen 412, a Commcell growth report may be generated, as by clicking on "Generate" button 440 in screen 412 (shown in FIG. 4B).

Figure 4B:
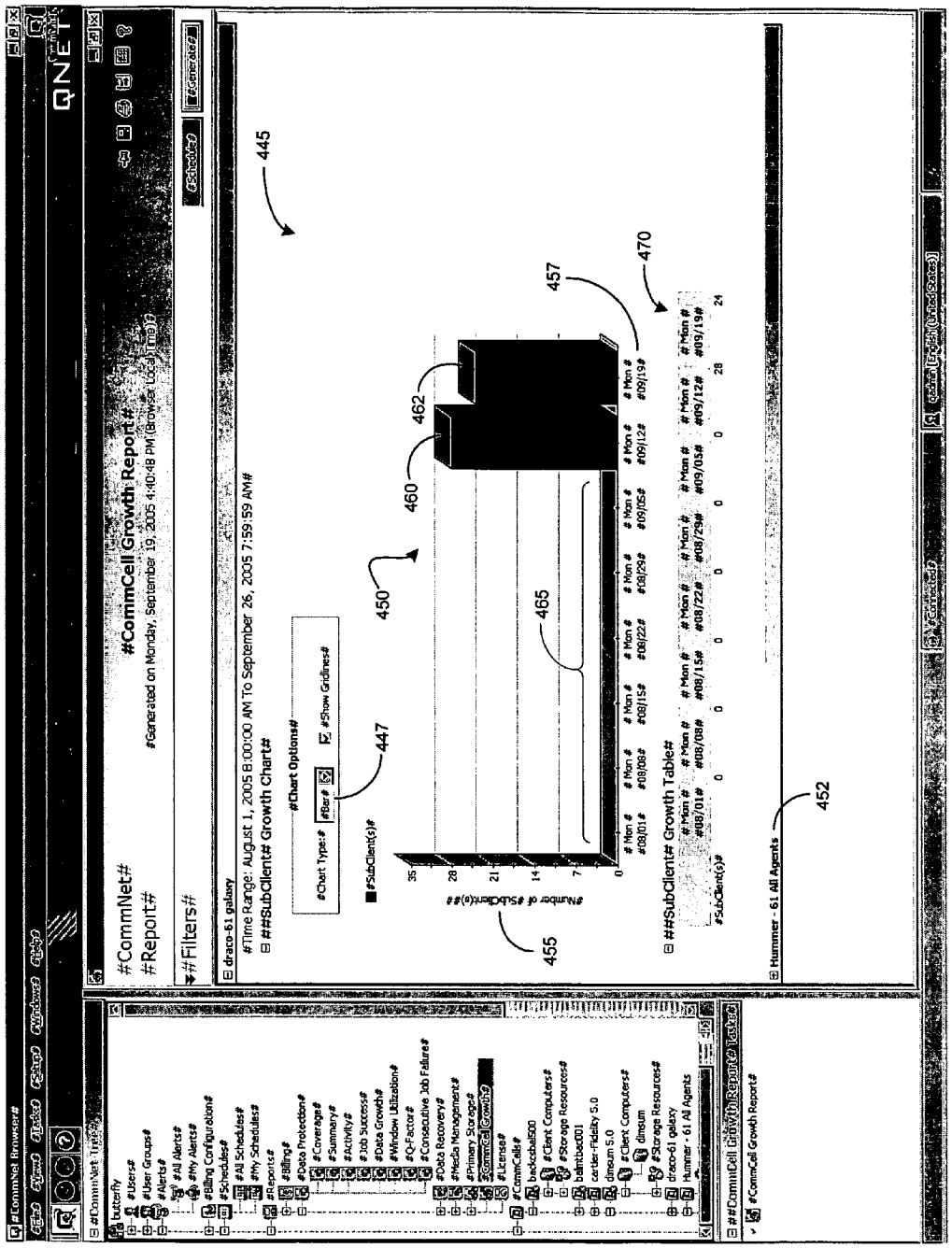
FIG. 4B is an illustrative interface screen for providing reported results based on the entered scheduling information shown in FIG. 4A according to an embodiment of the invention.

FIG. 4B shows an illustrative report screen 445 for provides results based on the information specified in FIG. 4A according to an embodiment of the invention. The display option for the report may be changed using chart option menu 447. For example, the current report display for subclient components associated with the storage operation cell "Hummer" (i.e., as indicated by information bar 452 within screen 445) is displayed by bar graph 450. Bar graph 450 may display the number of subclients in use during storage operations, as indicated at 455, as a function of a selected time range, indicated at 457. Bar 460 may indicate that during the week of Monday, Sep. 12 (i.e., #09/12#), twenty-eight subclients were involved in storage operations. Similarly, bar 462 may indicate that during the week of Monday, Sep. 19 (i.e., #09/19#), twenty-four subclients were involved in storage operations, which indicates a reduction compared to the previous week. Graph 450 also illustrates that over an eight-week period (i.e., from Mon. 08/01-Mon. 09/19), six weeks show no subclient activity, as indicated at 465.

In addition to graph 450, table 470 may also illustrate the results associated with subclient activities in storage operation cell Hummer. The generated results may provide user and administrators with an indication as to how a particular component or module has been utilized. This may include the amount of data traffic, data copied or moved to and from various locations, resources used such as certain media management components or storage device capacity, system bandwidth etc.

Based on this information, operational trends may be determined, which may provide the ability to forecasting future resource needs. For example, the results shown in graph 450 or table 470 may indicate that there is no increase associated with the number of active subclients within the storage operation cell (e.g., based on entries 460 and 462). Thus, no additional resources may need to be allocated based on the observed information, which, in some instances, may indicate the storage operation cell may additional resources to spare. However, if the results had shown an increase in the number of subclients used in the storage operation cell, this increased trend over the eight-week time period allows the system or a user to recognize and plan for any resource shortage or bottleneck including adding or assigning alternative resources to the storage operation cell such as media agents, data paths, storage devices such as tape drives and associated storage media (e.g., tapes, discs, etc.).

In determining a trend or trends in the growth results, various algorithms, formula, and/or data manipulation techniques such as linear regression, extrapolation, interpolation, best fit curves, likelihood functions or other techniques known in the art may be employed based on the data points available and the desired metrics to be calculated.

Figure 5A:
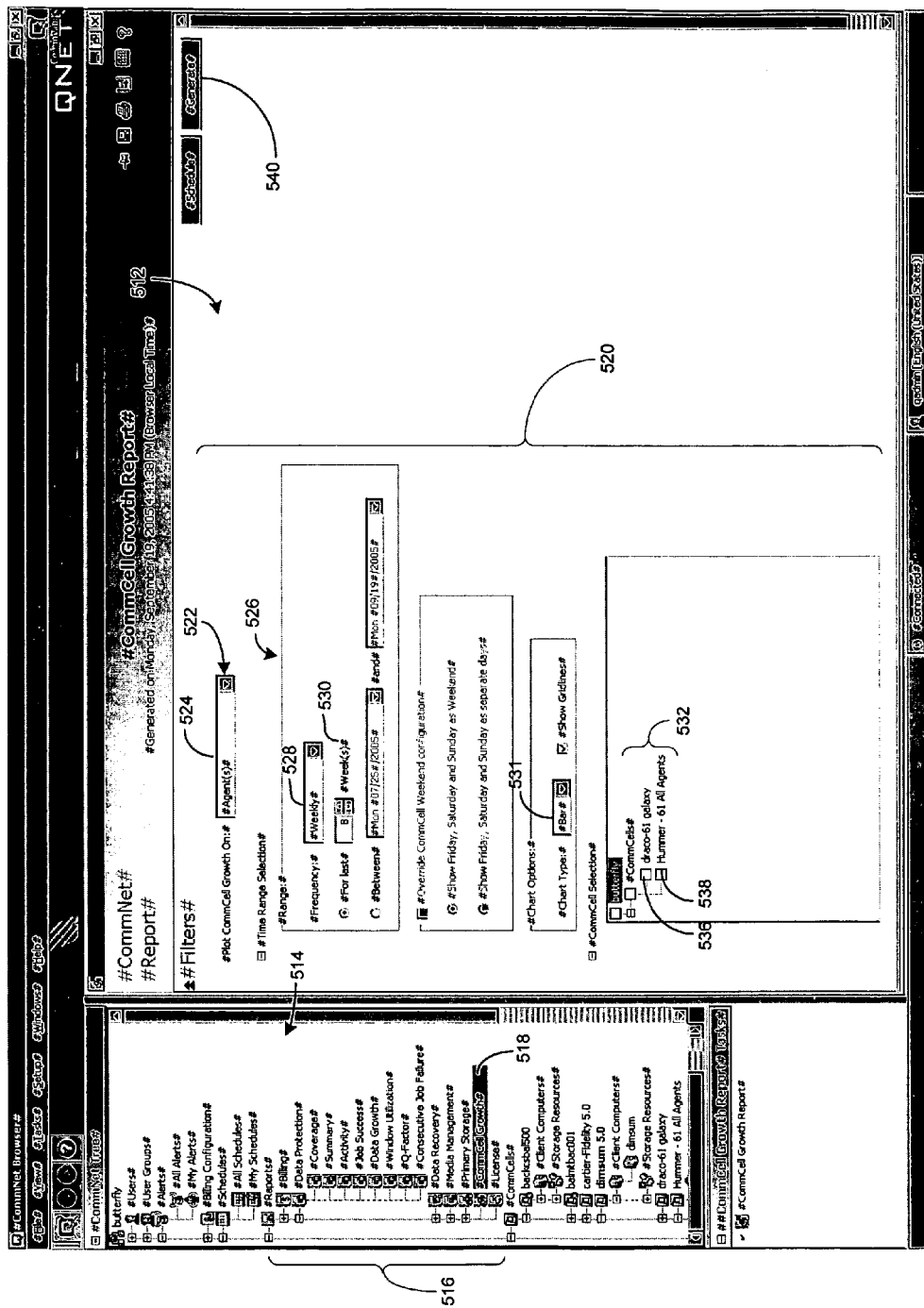
FIG. 5A is another illustrative interface screen for entering report generation scheduling information for trending and resource forecasting in accordance with another embodiment of the invention.

FIG. 5A shows another illustrative display 512 generated by a reporting module according to an embodiment of the invention. Similar to the interface screen of FIG. 4A, screen 512 may also include directory tree 514, which may allow users to access and manage different parts of a storage operation system from a unified display. For example, directory tree 514 may also include a "reports" field 516. As shown, screen 512 may include menu option 522 for selecting components or modules of the storage operation system that may be used in generating growth reports associated with the selected components or modules. In the illustrated embodiment, Media Agent(s) option 524 has been selected.

Scheduling options 526 may include various time range selection options. For example, a user may select a growth report that provides information based on frequency (e.g., a weekly basis) and over a specified time range (e.g., over last 8 weeks). Thus, frequency option 528 and data range option 530 may provide a report that may be generated based on data agent related information that is collected once a week (i.e., based on option 528) over an eight-week period (i.e., based on option 530). Scheduling option 531 may include a display chart option for displaying the report results. In the provided example, a bar graph display may be selected. A report may be generated for data agent of a particular one or more selected storage operation cells using selection field 532. Thus, based on exemplary screen 512, storage operation cells 536 and 538 may be selected for growth report generation purposes. By clicking on "Generate" button 540 in screen 512, a corresponding report may be generated, as illustrated in FIG. 5B.

Figure 5B:
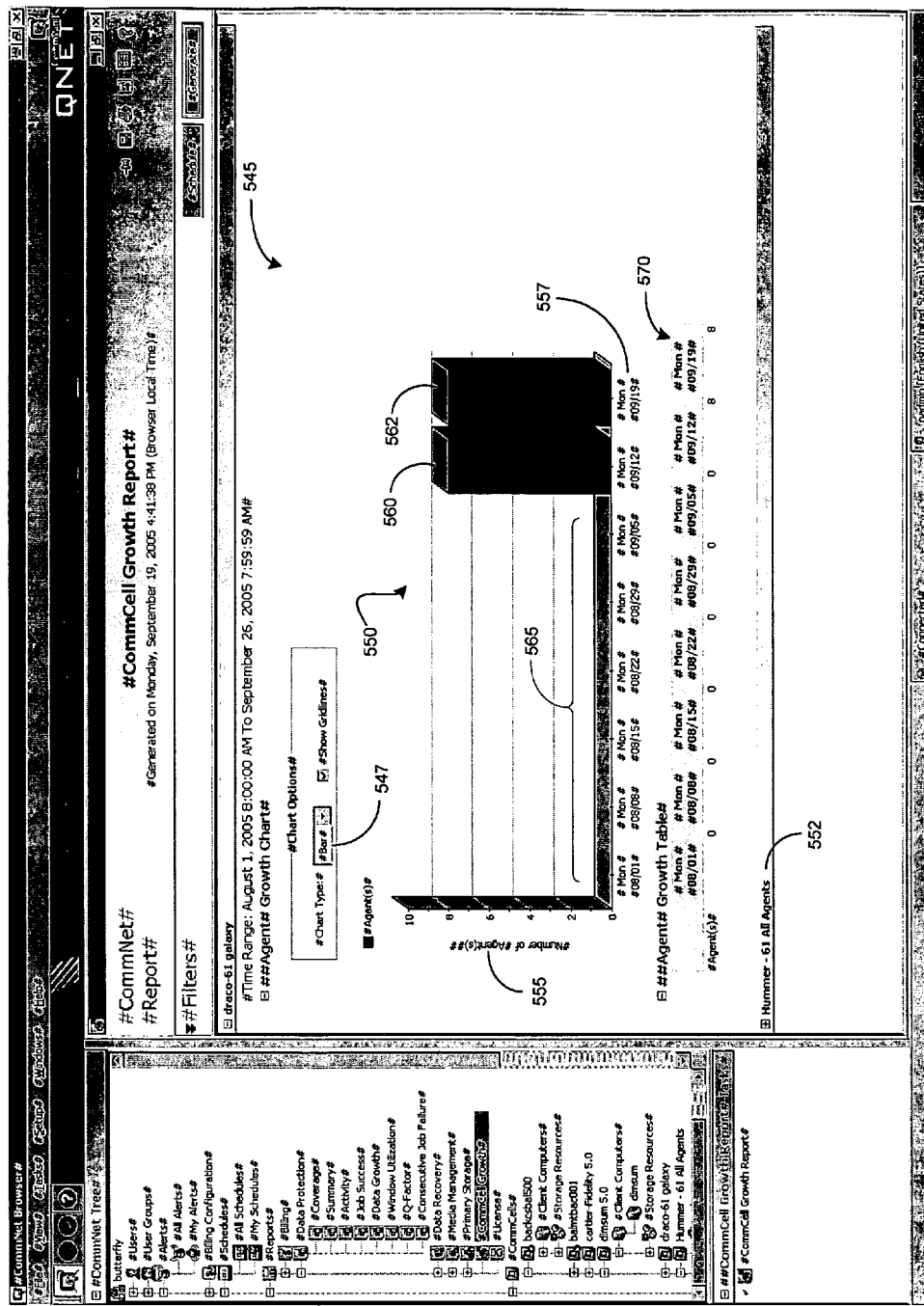
FIG. 5B is yet another illustrative interface screen for providing reported results based on the entered scheduling information shown in Fig 5A according to an embodiment of the invention.

FIG. 5B shows an illustrative interface screen 545 for providing reported results based on the entered scheduling information shown in FIG. 5A according to an embodiment of the invention. The display option for the growth report may be changed using chart option menu 547. For example, the current growth report display for data agent components associated with the storage operation cell Hummer" (i.e., as indicated by information bar 552 within screen 545) is displayed by bar graph 550. Bar graph 550 may display the number of data agents in use during storage operations, indicated at 555, as a function of a selected time range, indicated at 557. Bar 560 may indicate that during the week of Monday, Sep. 12 (i.e., #09/12#), eight data agents were involved in storage operations.

Similarly, bar 562 may indicate that during the week of Monday, Sep. 19 (i.e., #09/19#), eight subclients were also involved in storage operations, which indicates no change in the number of data agents compared to the previous week. Graph 550 also illustrates that over an eight-week period (i.e., from Mon. 08/01 Mon. 09/19), six weeks show no data agent activity, as indicated at 565.

In addition to graph 550, table 570 also illustrates the results associated with the number of active data agents in storage operation cell Hummer in table form. The generated results may provide users and administrators with an indication as to how a particular component or module has been utilized. As previously described, based on this information trends may be determined, which provides the ability to forecast future resource needs. For example, the results shown in graph 550 or table 570 may indicate that there is no increase associated with the number of active data agents used within the storage operation cell. However, if the results indicate an increase in the number of data agents used in the storage operation cell, this increased trend over the eight-week time period may have provided an opportunity for evaluating and adding more data agent resources to the storage operation cell. The number of data agent resources forecasted for addition to a storage operation cell may be based on other calculated metrics associated with the storage operation components such as, for example, the utilized bandwidth of data pathways during storage operations, status of storage operations, data load, available storage devices etc. As mentioned above, various other algorithms, formulae, and/or data manipulation techniques may be incorporated based on the metrics used to evaluate resources within the one or more storage operation cells within a storage operation system.

Figure 6A:
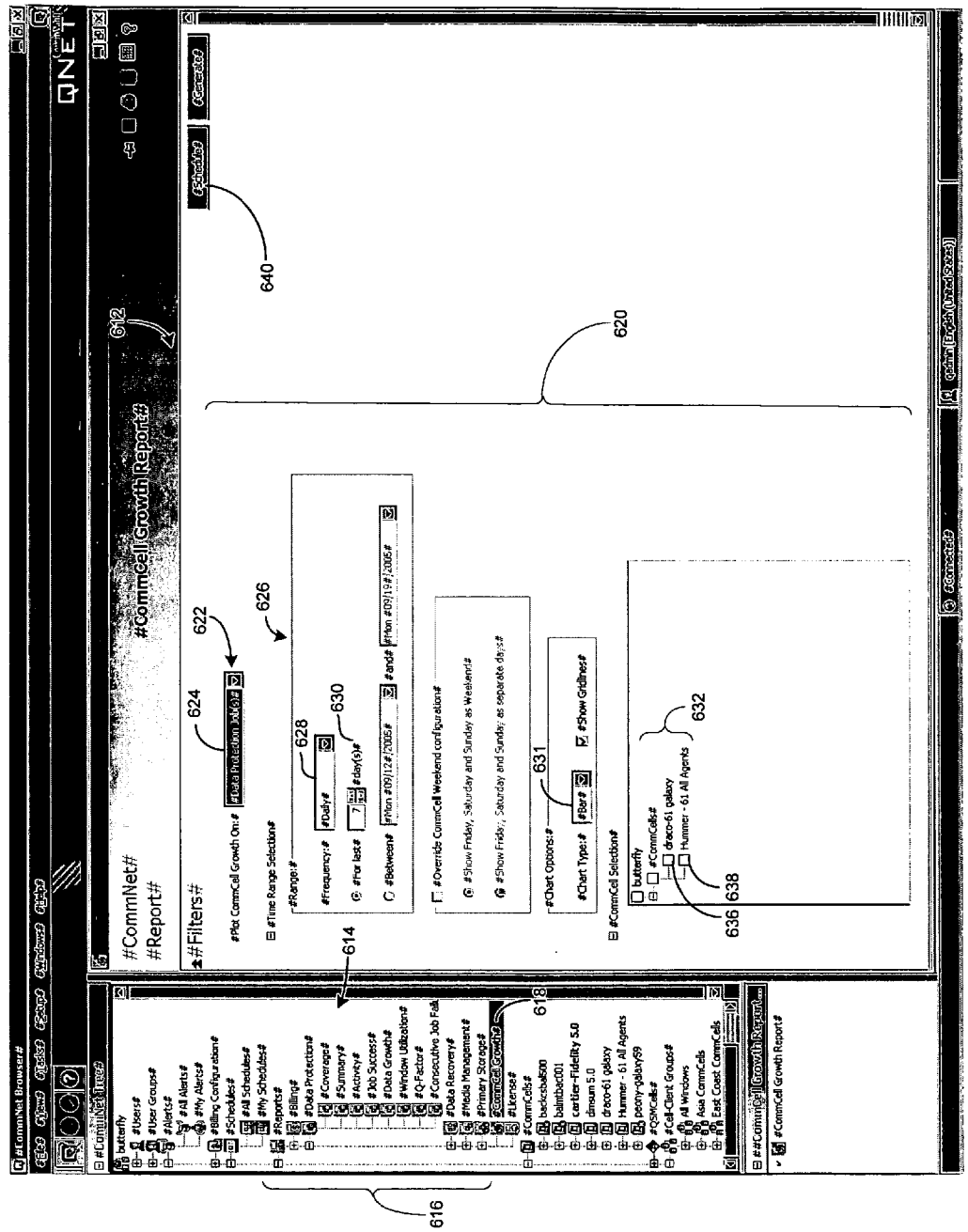
FIG. 6A is an illustrative interface screen for entering report generation scheduling information for providing data protection trends according to an embodiment of the invention.

FIG. 6A is yet another illustrative screen 612 generated by a management interface module for entering scheduling information for trending and resource forecasting according to an embodiment of the invention. For example, screen 612 may also be generated by a reports interface module 122 (FIG. 1), and accessed and displayed to users via interface module 115 (FIG. 1). The left side of screen 612 may include a directory tree 614 that allows users to access and manage different parts of a storage operation system from a unified display. For example, directory tree 614 may include a "reports" field 616, which may, among other things, provide system administrators or authorized uses with the ability to monitor and manage reports associated with various aspects of the storage operation system. By selecting, for example, "CommCell Growth" element 418 from "reports" field 616, an illustrative display 620 may be presented to an administrative user. Display 620 may include menu option 622 for selecting components or modules of the storage operation system that may be used in generating growth reports associated with the selected components or modules. For example, in the illustrated embodiment of FIG. 6A, Data Protection Job(s) 624 has been selected.

Scheduling options 626 may include various time range selection options. For example, a user may select a growth report that provides information based on frequency (e.g., a daily basis) and over a specified time range (e.g., over last 7 days). Thus, frequency option 628 and range option 630 may provide a growth report that may be generated based on the number of data protection jobs carried out daily (i.e., based on option 628), and over a seven day period (i.e., based on option 630).

Scheduling option 631 may include a display chart option for displaying the growth report results. In the provided example, a bar graph display is selected. A growth report may be generated for performed data protection jobs of a particular one or more selected storage operation cells, whereby the storage operation cells are selected using selection field 632. Thus, based on exemplary screen 612, storage operation cells 636 and 638 may be selected for growth report generation purposes. By clicking on "Generate" button 640 in screen 612, a corresponding growth report may be generated, as illustrated in FIG. 6B.

Figure 6B:
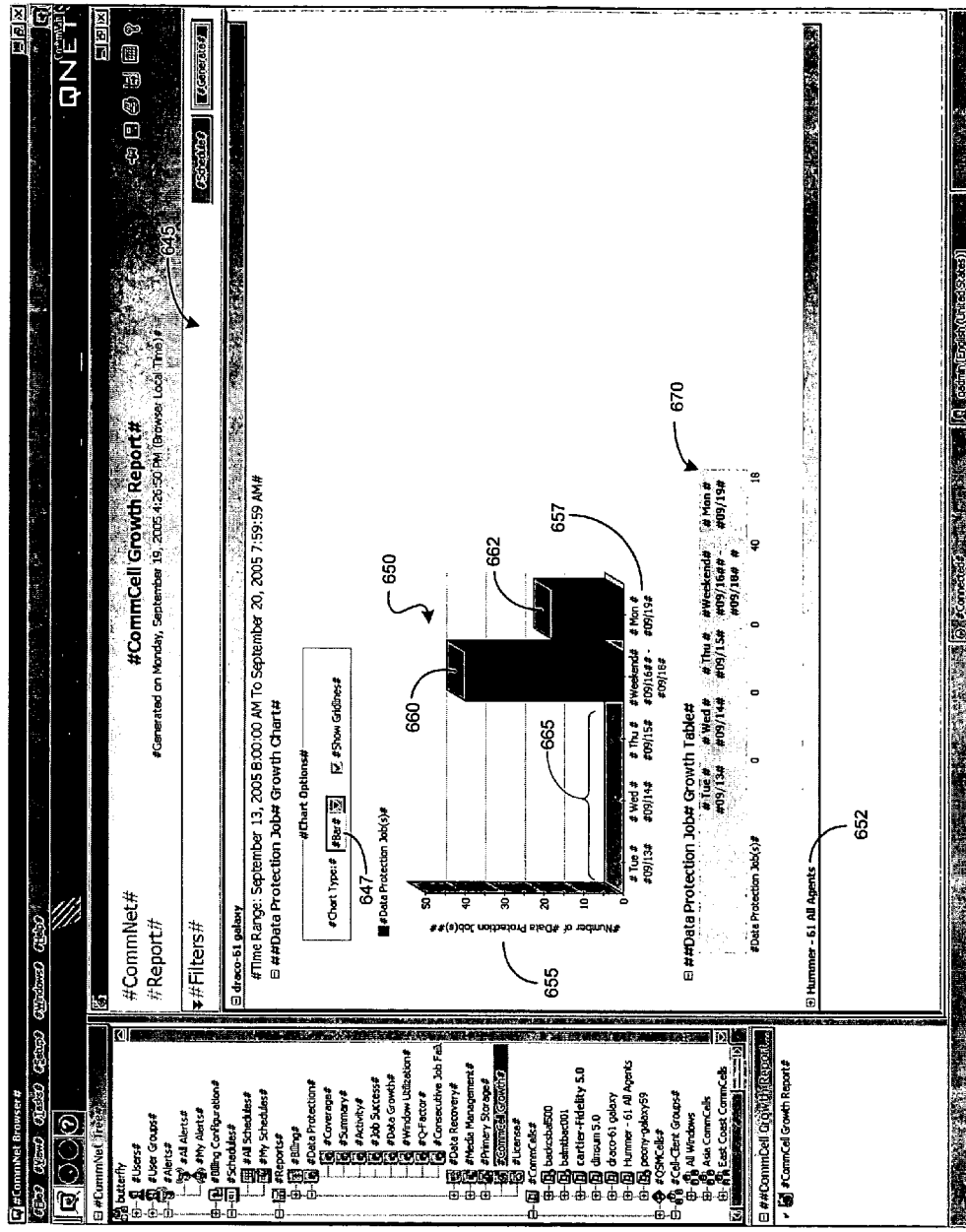
FIG. 6B is an illustrative interface screen for providing reported results based on the entered scheduling information shown in FIG. 6A according to an embodiment of the invention.

FIG. 6B shows an illustrative interface screen 645 for providing reported results based on the entered scheduling information shown in FIG. 6A according to an embodiment of the invention. The display option for the growth report may be changed using chart option menu 647. For example, the current report display for data protection jobs associated with the storage operation cell Hummer (i.e., as indicated by information bar 652 within screen 645) is displayed by bar graph 650. Bar graph 650 may display the number of data protection jobs, indicated at 655, as a function of a selected time range, as indicated at 657. Bar 660 may indicate that during the weekend of Sep. 16-18 (i.e., #09/16-09/18#), forty data protection jobs were performed. Similarly, bar 662 may indicate that on the following Monday, Sep. 19 (i.e., #09/19#), eighteen data protection jobs were performed, indicating a reduction in data protection jobs compared to the weekend. Graph 650 also illustrates that over the period of about a week (i.e., from Tues. 09/13-Mon. 09/19), for three days, no data protection jobs are performed, as indicated at 665.

In addition to graph 650, table 670 may also illustrate the growth results associated with the listed data protection jobs in storage operation cell Hummer. The generated results may provide users and administrators with information regarding various data protection activities that may have been performed. Based on this information, trends may be determined, which may provide opportunities for forecasting future resource needs. For example, the results shown in graph 650 or table 670 may indicate that there may be a trend associated with the increased number of data protection jobs occurring over weekends. Using this information, additional storage system resources may be assigned to handle the increased data load associated with performing the increased number of data protection jobs during busy periods such the weekends. For example, additional storage devices and/or media agents may be utilized during these periods.

In determining a trend or trends in the growth results, various algorithms, formula, and/or data manipulation techniques may be incorporated based on the metrics used to evaluate resources within the one or more storage operation cells within a storage operation system. Moreover, system parameters may change or vary according to needs of the end-user of the storage operation system. For example, if the end-user is in the financial business, the metrics used for determining when and how often to perform data protection jobs may differ from those used in other industries such as retail.

For example, the storage capacity thresholds used to trigger a warning condition may differ depending on the usage rate of storage capacity. If, for example, the rate of data storage capacity usage is high, such as in a financial application, it may be desired to use a lower threshold (e.g., 60%) for a warning condition, thus, providing sufficient advance notice to secure additional resources. In a retail application, however, the rate of consumption of storage media may be much lower, so that a warning threshold level may be set a higher percentage (e.g., 80%) which still providing sufficient time to secure additional resources. Thus the reporting modules of the present invention, may be used to analyze storage capacity usage information to predict future storage resource needs, (e.g., additional storage devices) before the resources become overburdened, reach maximum capacity, or become other unusable or inoperable.

In some embodiments of the invention, user-defined metrics may be utilized for generating system management information that may be associated with one or more storage operation cells within a storage system. In such embodiments, users or system administrators may be able to apply desired metrics for particular storage activities. For example, different statistical predictive analysis routines may be applied to data storage activities (e.g., read and/or write operation) associated with storage devices. Other examples may include applying metrics associated with the data pathways taken by storage data during particular storage operations involving sensitive data (e.g., classified information).

In other embodiments of the invention, default-metrics may be utilized for generating system management information that may be associated with one or more storage operation cells within a storage system. In such embodiments, based on end-user requirements, the storage manager and management interface module may provide a set of standard metrics (e.g., storage device priority level) and scheduling criteria (e.g., data backup frequency) for processing storage activity information prior to generating reports (e.g., growth reports). For example, if the storage system is used in retail based industries, a different set of default settings may be used than if the storage system is being utilized for storage management in, for example, law enforcement. For example, in law enforcement applications, data protection jobs may be scheduled to occur more often, the threshold values for storage capacity alerts associate with storage devices may be lower, and growth reports associated with the data protection jobs may be generated more often (see FIG. 6B).

Figure 8A:
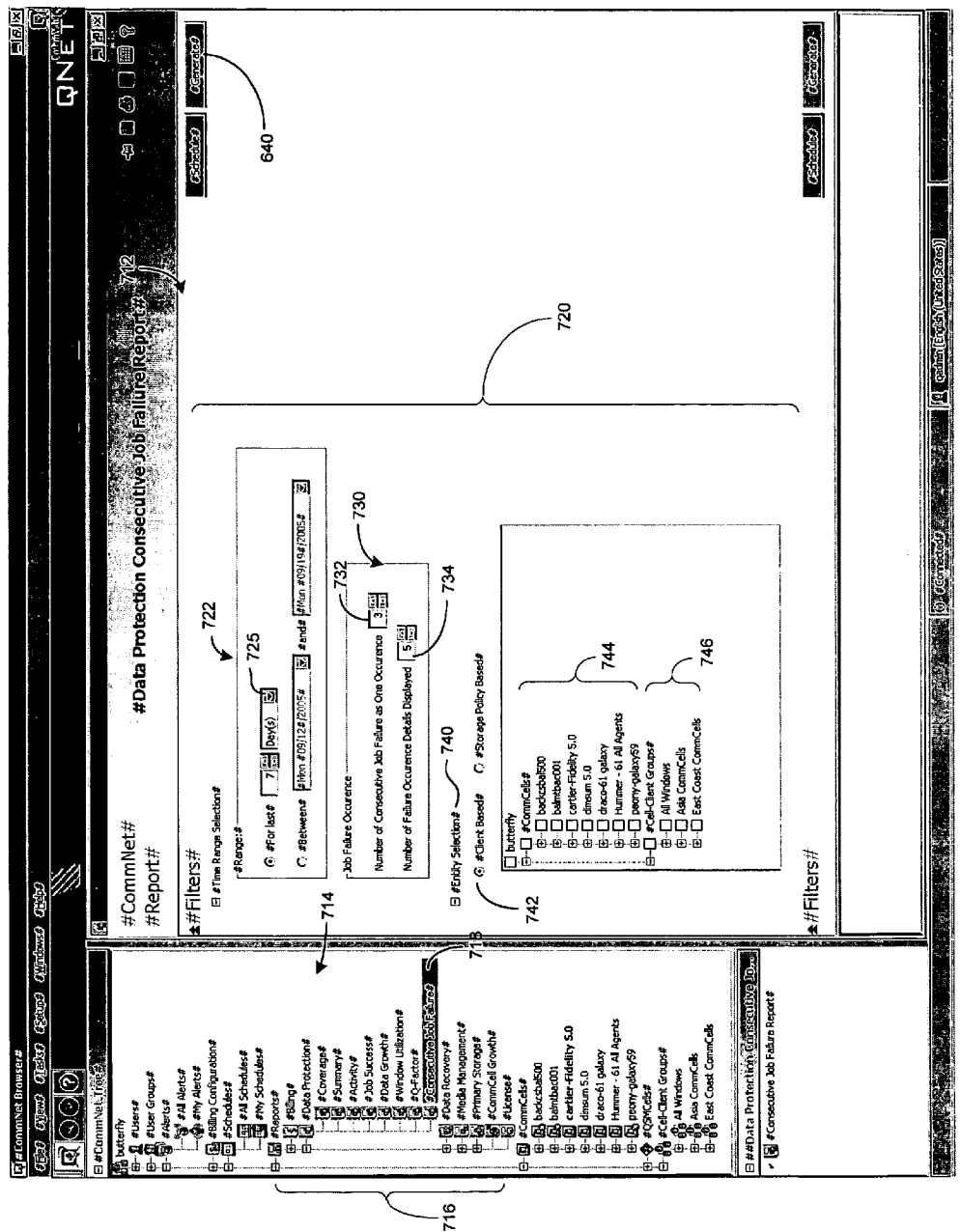
FIG. 8A is an illustrative interface screen for entering report generation scheduling information for evaluating failed storage operation trends according to an embodiment of the invention.

FIG. 8A is an illustrative interface screen 712 that may be used for specifying and evaluating failed storage operations according to an embodiment of the invention. For example, similar to the screens described above, screen 712 may be generated by management interface module 122 (FIG. 1), and accessed and displayed to users via interface module 115 (FIG. 1). The left side of screen 712 may include directory tree 714, which allows users to access and manage different parts of a storage operation system from a unified display. By selecting, for example, "CommCell Growth" element 718 from reports field 716, an illustrative display of various management scheduling options may be presented to a user via display 720. Display 720 may include various time range selection options. For example, a user may select to receive job failure reports over a specified time range (e.g., over last 7 days). Thus, option 725 may be used to access failure reports over the last seven days. Scheduling option 730 may include a failure occurrence setting 732, which may allow users to specify the number of consecutive job failures that are to be captured and considered a single failure. This allows a user to exclude spurious or accidental failures and define a number of consecutive failures considered to be operationally relevant.

For example, in storage systems where the end-user requirements are relatively fault tolerant, the number of consecutive job failures that may be defined as a single failure occurrence may be set to higher value (e.g., five consecutive failures defined as one occurrence) as opposed to more sensitive applications (e.g., two failures). Scheduling option 730 may also include a display setting 734, which provides an indication of the number of fault occurrence details that may be displayed in the failure report.

As illustrated in the exemplary embodiment of FIG. 8A, the displayed occurrences are set to five, but other numbers may be used if desired. A failure report may be generated for a particular one or more selected storage operation cells, whereby storage operation cells or storage operation cell groups may be selected using selection fields 744 and 746, respectively.

Figure 8B:
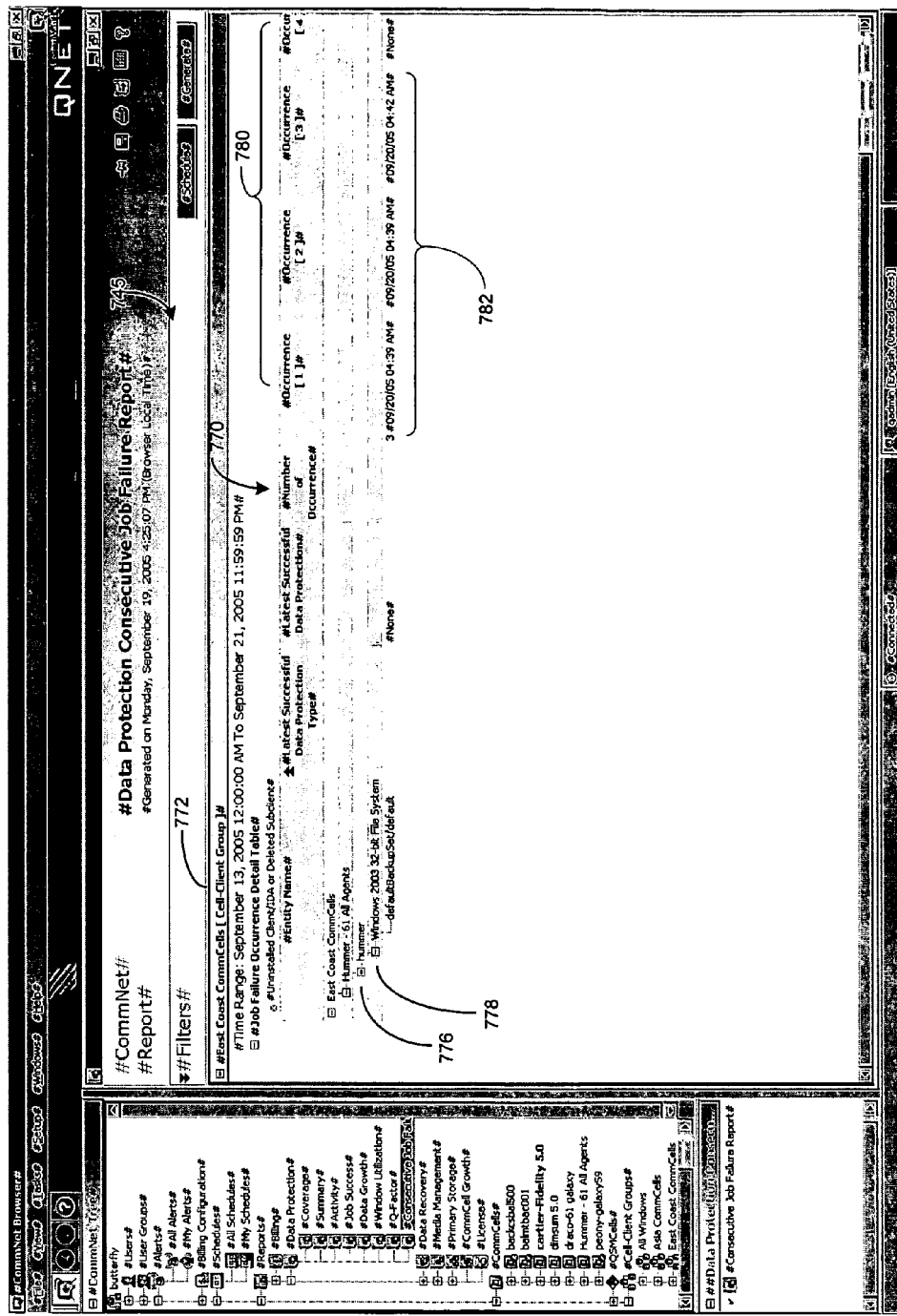
FIG. 8B is an illustrative interface screen for providing reported results based on the entered scheduling information shown in FIG. 8A according to an embodiment of the invention.

FIG. 8B shows an illustrative interface screen 745 for providing reported results based on the entered scheduling information shown in FIG. 8A according to an embodiment of the invention. Table 770 may illustrate consecutive failures occurrences for the selected "East Coast CommCells" client group, as indicated at information bar 772. The generated results may provide users and administrators with information regarding the occurrences of failures with the selected storage operation cell group (i.e., specified by "East Cost CommCells"). For example, within storage operation cell 776, storage operation cell application "Windows 2003 32-bit File System" 778 has incurred failures during default backup operations. The failure reports may be displayed as failure occurrences, as indicated by 780, whereby for each failure occurrence, time and date information 782 may be displayed.

Based on this information, trends may be determined, which may provide information associated with the root cause of certain failures. For example, a failure occurrence may be correlated with other storage operation metrics and other storage related parameters to determine the possible cause of the failure. If, for example, metrics indicate sufficient storage capacity, transmission bandwidth, and media management components, but one or more links in the data pathway to a storage device show increased congestion or failures, such congestion may be attributed to the possible fault. Such information may be correlated with other reports and performance information to identify common resources involved for fault isolation.

Using trending or forecasting analysis, other fault occurrences may be evaluated and compared with each other in a similar manner. If, for example, other fault occurrences show that a particular pathway or storage device has an increasing number of faults, this may indicate a device or pathway is close to failure or overburdened. This allows the system or a user to employ additional or alternative resources to correct a detected problem or inefficiency. For example, the one or more data pathways may be re-routed or additional data communications link may be installed to alleviate any detected problem.

Figure 9A:
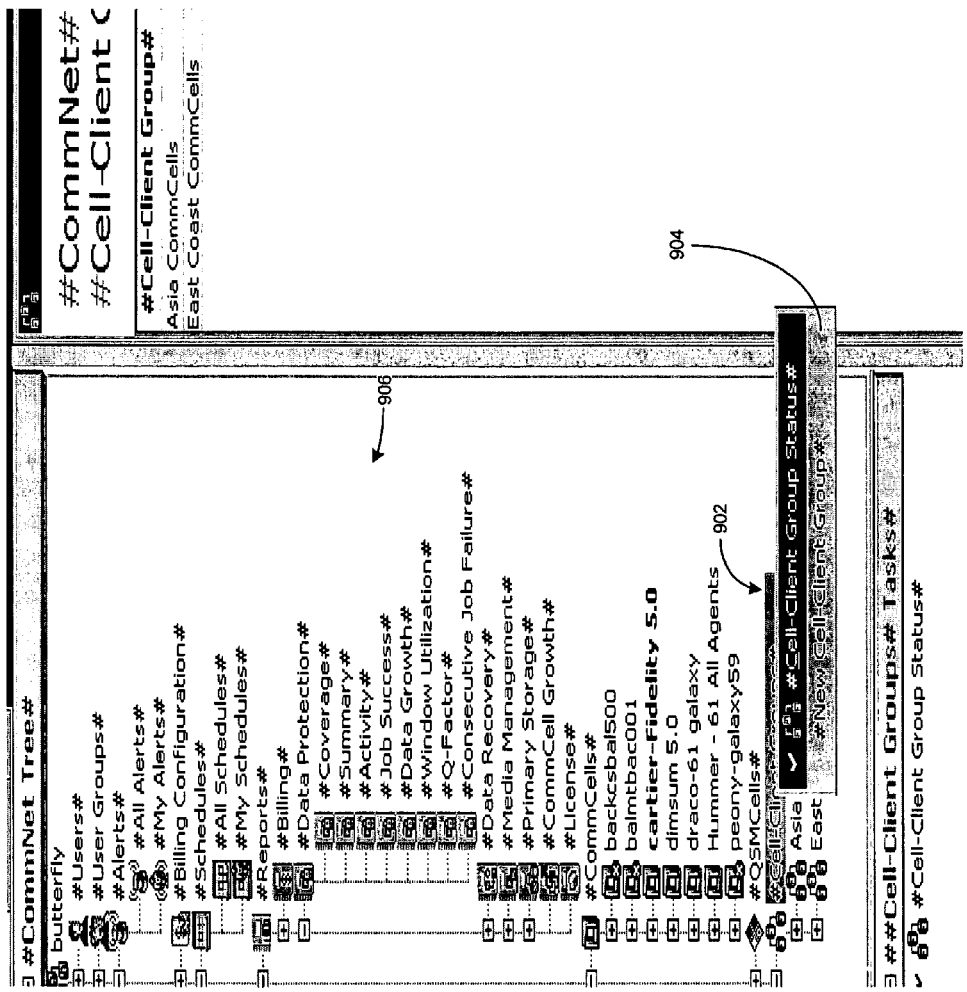
FIGS. 9A-9D are illustrative interface screens for creating client groups within a storage operation system according to an embodiment of the invention.
Figure 9B:
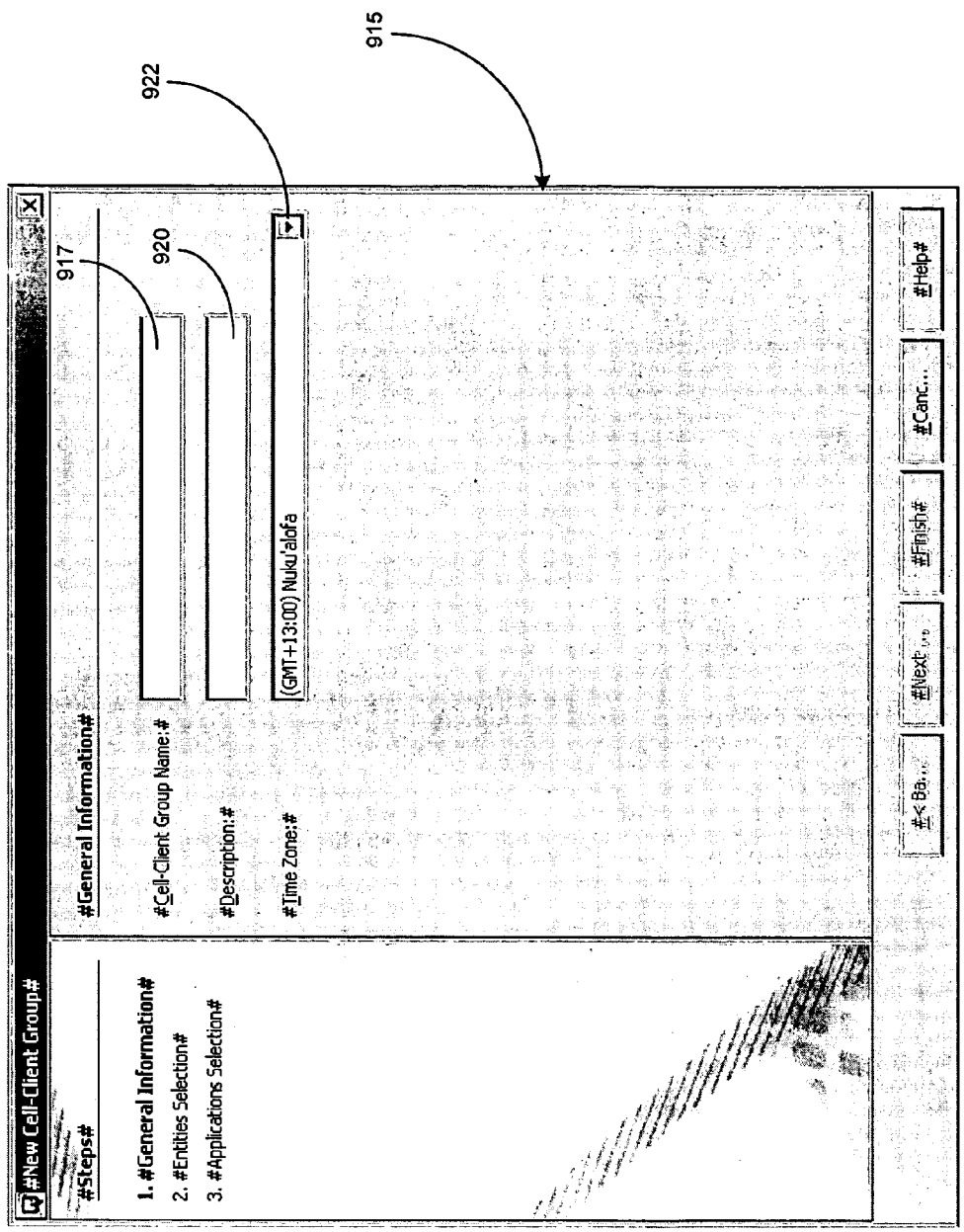
Figure 9C:
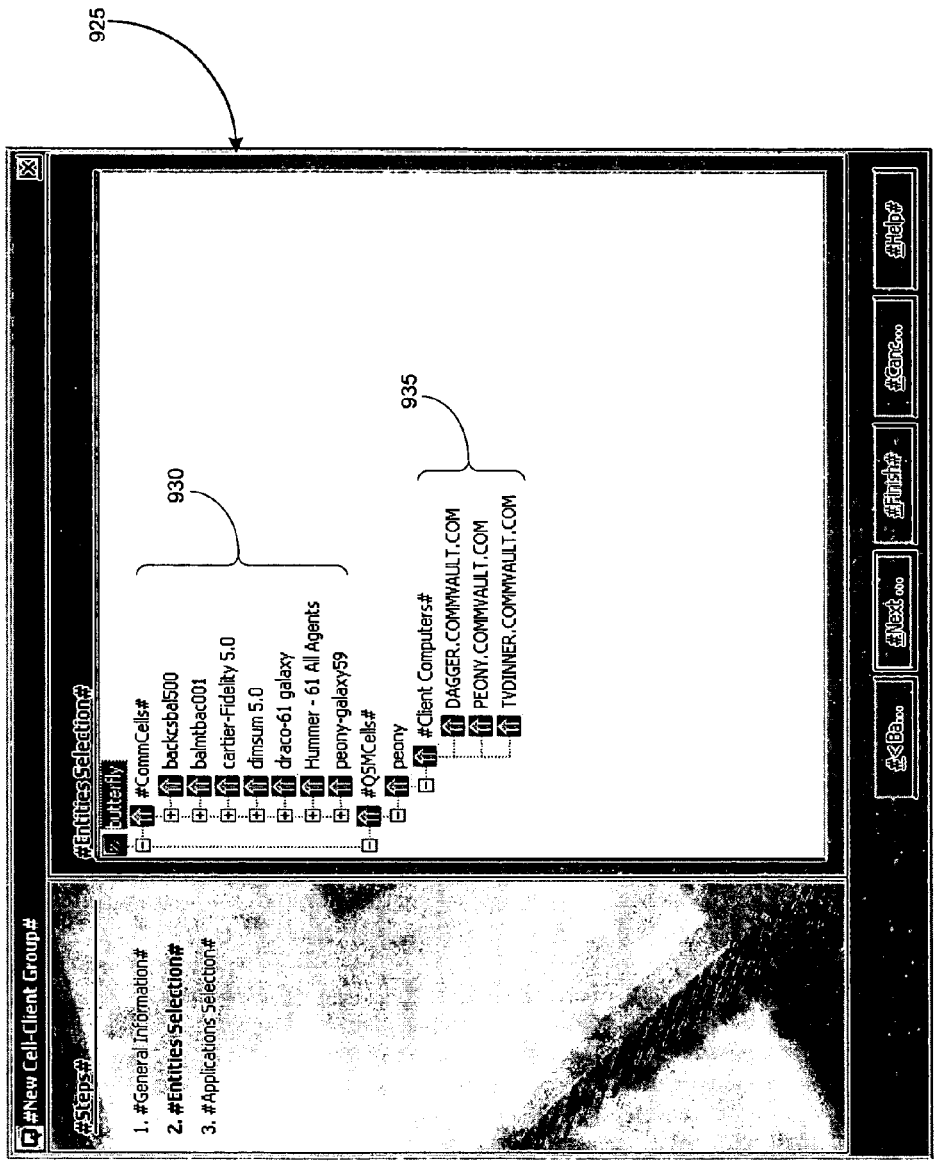

FIGS. 9A-9D are illustrative interface screens for creating client groups within a storage operation system according to an embodiment of the invention. Referring to FIG. 9A, a new group of storage operation cells may be created by, for example, clicking on Cell-Client Group field 902 and selecting the New Cell-Client Group field 904 from directory tree 906. By selecting New Cell Client Group field 904, an interface screen, such as exemplary interface screen 915 illustrated in FIG. 9B, may be presented to system users according to an embodiment of the invention. Using screen 915, a system administrator or authorized user may assign a name for the creation of a new storage operation cell group by making an entry in field 917.

Figure 9D:
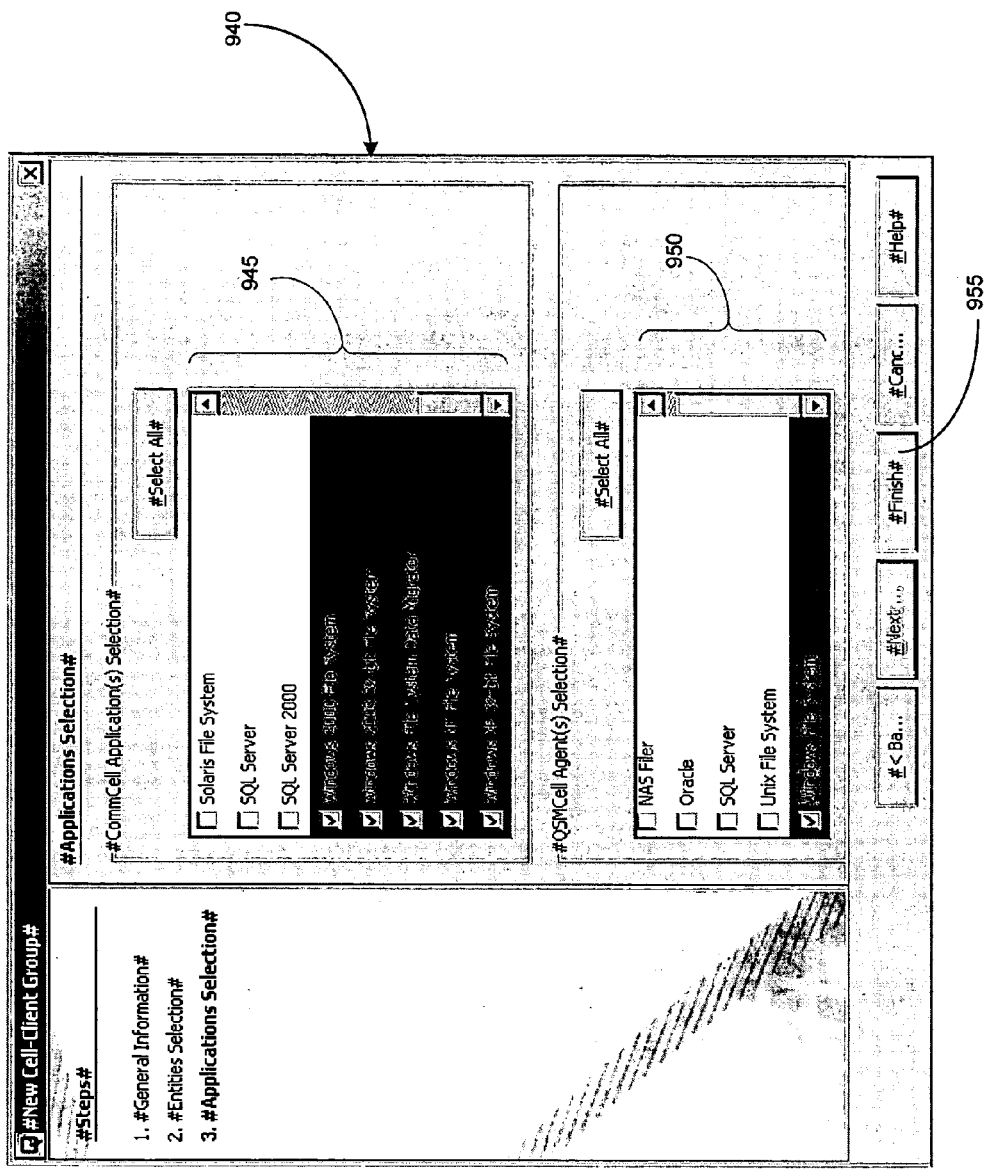

Description information associated with the cell group may be entered in field 920. Similarly time-zone selection may be set using pull-down menu 922. Once the fields in Screen 915 have been entered, an exemplary illustrative interface screen, such as screen 925 shown in FIG. 9C, may be presented according to an embodiment of the invention. From screen 925, one or more storage operation components may be selected. For example, utilizing fields 930, one or more storage operation cells (e.g., draco-61 galaxy, dimsum 5.0) may be selected for incorporation in the created storage operation cell group. Also, for example, fields 935 may be used to select one or more client computers (e.g., DAGGER COMMVAULT.COM) for each of the selected storage operation cells indicated in fields 930. Once the one or more storage operation components have been selected, the illustrative interface screen 940 of FIG. 9D may be used to select one or more applications for use in association with the selected storage operation cell group. As illustrated in FIG. 9D, fields 945 may provide a selectable list of applications associate with the storage operation cells associated with the created group. Also, as indicated at fields 950, a list of applications may also be selected for the other storage system components (e.g., data agents) within the group's storage operation cells. Once the selections have been made from fields 945 and 950, "Finish" button 955 may be activated.

Systems and modules described herein may comprise software, firmware, hardware, or any combination(s) of software, firmware, or hardware suitable for the purposes described herein. Software and other modules may reside on servers, workstations, personal computers, computerized tablets, PDAS, and other devices suitable for the purposes described herein. Software and other modules may be accessible via local memory, via a network, via a browser or other application in an ASP context, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, command line interfaces, and other interfaces suitable for the purposes described herein. Screenshots presented and described herein can be displayed differently as known in the art to input, access, change, manipulate, modify, alter, and work with information.

While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modification are intended to be included within the scope of the invention.

What is claimed is:

1. A method of identifying storage system resources to be added to a storage system, wherein the method is performed by a computing system having a processor and memory, the method comprising:
storing primary data created by a plurality of software applications on a plurality of primary storage devices in a primary storage system, wherein the primary data is stored in native formats associated with the plurality of software applications;
storing at least one or more secondary copies of the primary data on one or more secondary storage devices in a secondary storage system, wherein the one or more secondary copies are stored in one or more different formats than the native formats of the primary data;
managing with a storage manager, one or more secondary copy storage operations that copy at least a portion of the primary data to create the one or more secondary copies using a plurality of data agents associated with the plurality of software applications and a plurality of media management components associated with the one or more secondary storage devices, said managing secondary copy storage operations further comprising:
packaging primary data on the plurality of primary storage devices with the plurality of data agents to create packaged primary data, wherein each data agent packages primary data of a predefined data type,
receiving the packaged primary data at the plurality of media management components, the plurality of media management components configured to process the packaged primary data for different types of the one or more secondary storage devices, and
creating one or more secondary copies of the packaged primary data on the one or more secondary storage devices;
receiving information associated with the secondary copy storage operations that relates to at least a trend of a number of active data agents;
forecasting with the storage manager, a need for data storage capacity in the primary storage system based at least on the trend of the number of active data agents; and
identifying one or more primary storage system resources to be added to the primary storage system based on the forecasting;
forecasting with the storage manager, a need for additional data storage capacity in the secondary storage system based at least on the trend of the number of active data agents in the primary storage system; and
identifying one or more secondary storage system resources to be added to the second storage system based on the forecasting.

2. The method of claim 1, wherein different media management components are configured to process the packaged data for different types of the one or more secondary storage devices, wherein at least one media management component processes the packaged data for a tape drive and at least one media management component processes the packaged data for a disk drive.

3. The method of claim 1, wherein:
receiving the packaged data further comprises receiving information relating to at least a trend of a number of data protection jobs; and
forecasting the need for data storage capacity in the storage system is further based at least on the trend of the number of data protection jobs.

4. The method of claim 1, wherein:
receiving the packaged data further comprises receiving information relating to at least a trend of a number of active clients and sub-clients; and
forecasting the need for data storage capacity in the storage system is further based at least on the trend of the number of active clients and sub-clients.

5. The method of claim 1, wherein:
receiving the packaged data further comprises receiving information relating to at least a trend of a number of active media agents; and
forecasting the need for data storage capacity in the storage system based at least on the trend of the number of active media agents.

6. The method of claim 1, wherein:
receiving the packaged data further comprises receiving information relating to at least a trend of a number of fault occurrences; and
forecasting the need for data storage capacity in the storage system is further based at least on the trend of the number of fault occurrences.

7. The method of claim 1, further comprising activating a warning upon determining that the number of active data agents has reached a threshold number.

8. A storage operation system for use in a data storage network, the storage operation system comprising:
- a plurality of primary storage devices comprising primary data created by a plurality of software applications on in a primary storage system, wherein the primary data is stored in native formats associated with the software applications;
- one or more secondary storage devices configured to store at least one or more secondary copies of the primary data on in a secondary storage system, wherein the one or more secondary copies are stored in one or more different formats than the native formats of the primary data;
- a storage manager component executing in one or more processors on a computing device and configured to manage one or more secondary copy operations that copies at least a portion of the primary data to create the one or more secondary copies associated with the one or more secondary storage devices using a plurality of data agents associated with the plurality of primary storage devices and a plurality of media management components associated with the one or more secondary storage devices, wherein
  - the one or more data agents are configured to package primary data as directed by the storage manager component prior to a secondary copy storage operation of the primary data, wherein each data agent is configured to package primary data of a predefined data type, and
  - the plurality of media management components are configured to receive and process the packaged primary data from the one or more data agents for different types of the one or more secondary storage devices; and
- a reporting component associated with the storage manager component, the reporting component configured to:
  - receive information associated with the secondary copy storage operations that relates to at least a trend of a number of active data agents,
  - forecast a need for data storage capacity in the primary storage system based at least on the trend of the number of active data agents, and
  - identify one or more primary storage system resources to be added to the primary storage system based on the forecasting;
  - forecast a need for additional data storage capacity in the secondary storage system based at least on the trend of the number of active data agents in the primary storage system; and
  - identify one or more secondary storage system resources to be added to the second storage system based on the forecasting.

9. The system of claim 8, wherein different media management components are configured to process the packaged data for different types of the one or more storage devices, wherein at least one media management component processes the packaged data for a tape drive and at least one media management component processes the packaged data for a disk drive such that the one or more storage devices contain a backup copy of the data located on the data store.

10. The system of claim 8, wherein the storage system resources comprise at least one of clients, sub-clients, media agents, storage devices, data agents, storage media, and data transfer paths.

11. The system of claim 8, wherein the reporting component further receives information relating to at least a trend of a number of data protection jobs and forecasts the need for data storage capacity in the storage system based at least on the trend of the number of data protection jobs.

12. The system of claim 8, wherein the reporting component further receives information relating to at least a trend of a number of active clients and sub-clients and forecasts the need for data storage capacity in the storage system based at least on the trend of the number of active clients and sub-clients.

13. The system of claim 8, wherein the reporting component further receives information relating to at least a trend of a number of active media agents and forecasts the need for data storage capacity in the storage system based at least on the trend of the number of active media agents.

14. The system of claim 8, wherein the reporting component further receives information relating to at least a trend of a number of fault occurrences and forecasts the need for data storage capacity in the storage system based at least on the trend of the number of fault occurrences.

15. The system of claim 8, wherein the reporting component activates a warning upon determining that the number of active data agents has reached a threshold number.

* * * * *